(12) United States Patent
Tang et al.

(10) Patent No.: US 10,559,090 B2
(45) Date of Patent: Feb. 11, 2020

(54) METHOD AND APPARATUS FOR CALCULATING DUAL-CAMERA RELATIVE POSITION, AND DEVICE

(71) Applicant: Huawei Technologies Co., Ltd., Shenzhen (CN)

(72) Inventors: Zhongwei Tang, Shenzhen (CN); Huanhuan Ao, Shanghai (CN); Kang Qian, Tampere (FI); Wei Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 15/572,375

(22) PCT Filed: Mar. 9, 2016

(86) PCT No.: PCT/CN2016/075949
§ 371 (c)(1),
(2) Date: Nov. 7, 2017

(87) PCT Pub. No.: WO2017/008516
PCT Pub. Date: Jan. 19, 2017

(65) Prior Publication Data
US 2018/0150973 A1    May 31, 2018

(30) Foreign Application Priority Data
Jul. 15, 2015  (CN) .......................... 2015 1 0416283

(51) Int. Cl.
*G06T 7/73* (2017.01)
*G06T 3/00* (2006.01)
*H04N 13/204* (2018.01)

(52) U.S. Cl.
CPC .............. *G06T 7/75* (2017.01); *G06T 3/0068* (2013.01); *H04N 13/204* (2018.05);
(Continued)

(58) Field of Classification Search
None
See application file for complete search history.

(56) References Cited

U.S. PATENT DOCUMENTS

| 8,755,624 B2 | 6/2014 | Suk et al. |
| 2002/0113878 A1* | 8/2002 | Iwai ......................... G01C 3/08 348/187 |

(Continued)

FOREIGN PATENT DOCUMENTS

| CN | 101021947 A | 8/2007 |
| CN | 101231750 A | 7/2008 |

(Continued)

OTHER PUBLICATIONS

Machine Translation and Abstract of Chinese Publication No. CN101630406, dated Jan. 20, 2010, 27 pages.
(Continued)

*Primary Examiner* — Kim Y Vu
*Assistant Examiner* — Nathan J Bloom
(74) *Attorney, Agent, or Firm* — Conley Rose, P.C.

(57) ABSTRACT

A method for calculating a dual-camera relative position provided in the present disclosure includes obtaining M groups of dual-camera images, where each group of dual-camera images in the M groups includes two images obtained by photographing a same scene by dual cameras at the same time, screening the M groups of dual-camera images to obtain Q groups of dual-camera images that can be used to calculate the dual-camera relative position, obtaining dual-camera relative position parameters corresponding to each group of dual-camera images in the Q groups according to each group of dual-camera images in the Q groups, and obtaining optimal dual-camera relative position parameters from the Q groups of dual-camera relative position parameters. Therefore, the dual-camera relative position can be calculated when a scene is relatively difficult to recognize.

19 Claims, 6 Drawing Sheets

(52) U.S. Cl.
CPC .............. *G06T 2207/10021* (2013.01); *G06T 2207/20081* (2013.01); *G06T 2207/30244* (2013.01)

(56) References Cited

U.S. PATENT DOCUMENTS

| | | | | |
|---|---|---|---|---|
| 2004/0247174 | A1* | 12/2004 | Lyons | G06F 3/04845 382/154 |
| 2007/0263924 | A1* | 11/2007 | Kochi | G01B 11/24 382/154 |
| 2010/0054627 | A1* | 3/2010 | Rosenberg | G06T 3/4038 382/284 |
| 2011/0255775 | A1* | 10/2011 | McNamer | H04N 5/23293 382/154 |
| 2012/0249802 | A1 | 10/2012 | Taylor et al. | |
| 2014/0002452 | A1* | 1/2014 | Levin | H04N 13/246 345/419 |
| 2014/0125771 | A1* | 5/2014 | Grossmann | G06T 5/006 348/47 |

FOREIGN PATENT DOCUMENTS

| | | |
|---|---|---|
| CN | 101630406 A | 1/2010 |
| CN | 101826206 A | 9/2010 |
| CN | 102567989 A | 7/2012 |
| CN | 103247053 A | 8/2013 |
| CN | 104169965 A | 11/2014 |
| WO | 2013151883 A1 | 10/2013 |
| WO | 2014022036 A1 | 2/2014 |

OTHER PUBLICATIONS

Machine Translation and Abstract of Chinese Publication No. CN101826206, dated Sep. 8, 2010, 21 pages.
Machine Translation and Abstract of Chinese Publication No. CN102567989, dated Jul. 11, 2012, 14 pages.
Machine Translation and Abstract of Chinese Publication No. CN103247053, dated Aug. 14, 2013, 21 pages.
Fischler, M., et al., "Random Sample Consensus: A Paradigm for Model Fitting with Applications to Image Analysis and Automated Cartography," Communications of the ACM, vol. 24, No. 6, Jun. 1981, pp. 381-395.
Zhang, Z., "A Flexible New Technique for Camera Calibration," IEEE Transactions on Pattern Analysis and Machine Intelligence, vol. 22, No. 11, Nov. 2000, pp. 1330-1334.
Levenberg, K., "A Method for the Solution of Certain Non-Linear Problems in Least Squares," Quarterly of Applied Mathematics 2, vol. 2, No. 2, Feb. 21, 1944, pp. 164-168.
Hartley, R., "In Defense of the Eight-Point Algorithm," IEEE Transaction on Pattern Recognition and Machine Intelligence, vol. 19, No. 6, Jun. 1997, pp. 580-581.
Hartley, R., et al., "Multiple View Geometry in Computer Vision," Cambridge University Press, 2004, 673 pages.
Foreign Communication From a Counterpart Application, PCT Application No. PCT/CN2016/075949, English Translation of International Search Report dated Jun. 13, 2016, 2 pages.
Foreign Communication From a Counterpart Application, European Application No. 16823664.4, Extended European Search Report dated Mar. 6, 2018, 9 pages.
Machine Translation and Abstract of Chinese Publication No. CN101021947, dated Aug. 22, 2007, 21 pages.
Machine Translation and Abstract of Chinese Publication No. CN101231750, dated Jul. 30, 2008, 13 pages.
Machine Translation and Abstract of Chinese Publication No. CN104169965, dated Nov. 26, 2014, 39 pages.
Foreign Communication From a Counterpart Application, Chinese Application No. 201510416283.2, Chinese Office Action dated Mar. 11, 2019, 8 pages.

\* cited by examiner

S501

Obtain a reference average error of first distances of all feature points in reference images according to optimal dual-camera relative position parameters, where the reference images are images that are photographed by two cameras except M groups of dual-camera images

S502

If the reference average error is greater than or equal to a preset error threshold, execute a method for calculating a dual-camera position again

FIG. 5

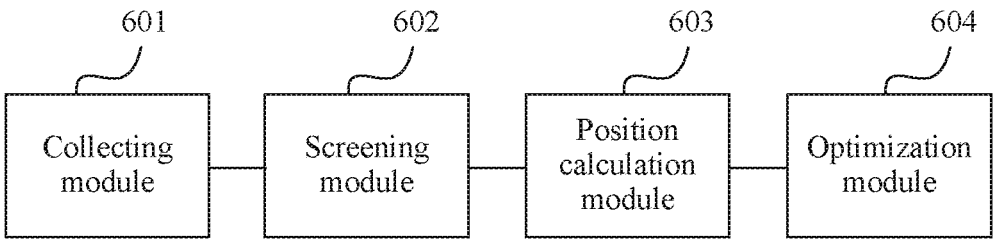

FIG. 6

METHOD AND APPARATUS FOR CALCULATING DUAL-CAMERA RELATIVE POSITION, AND DEVICE

CROSS-REFERENCE TO RELATED APPLICATIONS

This application is a U.S. National Stage of International Patent Application No. PCT/CN2016/075949 filed on Mar. 9, 2016, which claims priority to Chinese Patent Application No. 201510416283.2 filed on Jul. 15, 2015. Both of the aforementioned applications are hereby incorporated by reference in their entireties.

TECHNICAL FIELD

The present disclosure relates to video technologies, and in particular, to a method and an apparatus for calculating a dual-camera relative position, and a device.

BACKGROUND

Generally, a camera can only record a two-dimensional photo. However, if two cameras are used to photograph an object or a scene at the same time, depth information of an original photographed object can be restored, and then three-dimensional information may be restored.

Currently, when two cameras are used for photographing, accurate information used to indicate a relative position of the two cameras is required for a calculation of depth information of an original photographed object. However, in a process in which a user uses dual cameras, a relative position of the two cameras may change because of impact of dropping, pressure, temperature, or the like, and becomes inconsistent with an original relative position. Therefore, the relative position of the two cameras in the dual cameras needs to be re-calculated. Currently, a dual-camera relative position may be calculated using a group of images. It is assumed that camera intrinsic parameters are fixed, and the relative position of the two cameras in the dual cameras is deduced using an algorithm.

However, when a photographed scene is excessively far from cameras, or a most part of a scene is a plane or nearly a plane, and there is no object with rich texture in the scene, or the like, the scene is relatively difficult to recognize, and therefore accuracy of a calculated relative position obtained using a current algorithm cannot be ensured.

SUMMARY

The present disclosure provides a method and an apparatus for calculating a dual-camera relative position, and a device, to calculate a dual-camera relative position when a scene is relatively difficult to recognize.

According to a first aspect, the present disclosure provides a method for calculating a dual-camera relative position, including obtaining M groups of dual-camera images, where each group of dual-camera images in the M groups includes two images that are obtained by photographing a same scene by dual cameras at the same time, and M is a positive integer, screening the M groups of dual-camera images to obtain Q groups of dual-camera images that can be used to calculate the dual-camera relative position, where Q is a positive integer, and Q≤M, obtaining dual-camera relative position parameters corresponding to each group of dual-camera images in the N groups according to each group of dual-camera images in the Q groups, and obtaining optimal dual-camera relative position parameters from Q groups of dual-camera image relative position parameters.

With reference to the first aspect, in a first implementation, the relative position parameters include a relative translation distance t between the two cameras and a relative rotation matrix R between the two cameras, where $t=(t_x, t_y, t_z)^T$, and x, y, and z are respectively three orthogonal coordinate axes of a plane rectangular coordinate system.

With reference to the first aspect and the first implementation, in a second implementation, the screening each group of dual-camera images, to obtain multiple groups of dual-camera images that can be used to calculate the relative position includes obtaining a homography matrix corresponding to a first group of dual-camera images, where each group of dual-camera images in the M groups of dual-camera images is the first group of dual-camera images, determining a projection error between two images in the first group of dual-camera images according to the homography matrix, and determining that the first group of dual-camera images are dual-camera images that can be used to calculate the dual-camera relative position when the projection error is greater than or equal to a preset error threshold.

With reference to the first aspect and the foregoing two implementations, in a third implementation, determining a projection error between two images in the first group of dual-camera images according to the homography matrix includes determining the projection error e between the two images in the first group of dual-camera images according to $$e = \sqrt{\frac{\sum_{j=1}^{N'} \|HY_i - Y'_i\|_2^2}{N'}},$$

where H represents the homography matrix corresponding to the first group of dual-camera images, $Y_i$ represents a feature point $(x_i, y_i)$ of a first image in the first group of dual-camera images, $Y'_i$ represents a feature point $(x'_i, y'_i)$ of a second image in the first group of dual-camera images, j is a positive integer, j≤N', N' represents a quantity of feature point pairs $(Y_i, Y'_i)$ in the first group of dual-camera images, the first image is an image that is photographed by a first camera in the two cameras, and the second image is an image that is photographed by a second camera in the two cameras.

With reference to the first aspect and the foregoing three implementations, in a fourth implementation, obtaining dual-camera relative position parameters corresponding to each group of dual-camera images in the Q groups according to each group of dual-camera images in the Q groups includes obtaining the relative translation distance t between the two cameras and the relative rotation matrix R between the two cameras according to a feature point pair $(X_i, X'_i)$ in a second group of dual-camera images, where each group of dual-camera images in the Q groups of dual-camera images is the second group of dual-camera images, $X_i$ represents a feature point $(x_i, y_i)$ of a first image in the second group of dual-camera images, $X'_i$ represents a feature point $(x'_i, y'_i)$ of a second image in the second group of dual-camera images, i is a positive integer, i≤N, N represents a quantity of feature point pairs $(X_i, X'_i)$ in the second group of dual-camera images, the first image is an image that is photographed by the first camera in the two cameras, and the second image is an image that is photographed by the second camera in the two cameras.

With reference to the first aspect and the foregoing four implementations, in a fifth implementation, obtaining the relative translation distance t between the two cameras and the relative rotation matrix R between the two cameras according to a feature point pair $(X_i, X'_i)$ in each group of dual-camera images in the Q groups includes obtaining t and R according to a non-linear optimization formula $$(t, R) = \underset{(t,R)}{\operatorname{argmin}} \sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}},$$

where $l'_i = K'^{-T}[t]_x R K^{-1} X_i$ is an epipolar line that is in the second image and corresponding to $X_i$, $l_i = -K^{-T} R^{-1} [t]_x K'^{-1} X'_i$ is an epipolar line that is in the first image and corresponding to $X'_i$, $l_{ia}$ and $l_{ib}$ are respectively a first component and a second component of the vector $l_i$, $l'_{ia}$ and $l'_{ib}$ are respectively a first component and a second component of the vector $l'_i$, K is an intrinsic parameter matrix of the first camera, K' is an intrinsic parameter matrix of the second camera, and $[t]_x$ is an antisymmetric matrix $$\begin{bmatrix} 0 & -t_z & t_y \\ t_z & 0 & -t_x \\ -t_y & t_x & 0 \end{bmatrix}$$

defined by t.

With reference to the first aspect and the foregoing five implementations, in a sixth implementation, before obtaining t and R according to a non-linear optimization formula $$(t, R) = \underset{(t,R)}{\operatorname{argmin}} \sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}},$$

the method further includes removing an incorrect feature point pair $(X_i, X'_i)$ in the second group of dual-camera images according to a random sample consensus (RANSAC) algorithm.

With reference to the first aspect and the foregoing six implementations, in a seventh implementation, after obtaining the relative translation distance t between the two cameras and the relative rotation matrix R between the two cameras according to a feature point pair $(X_i, X'_i)$ in a second group of dual-camera images, the method further includes obtaining a first distance of each feature point in the second group of dual-camera images according to the relative translation distance t and the relative rotation matrix R, where the first distance is a distance from each feature point to an epipolar line corresponding to the feature point, the epipolar line that is in the second image and corresponding to the feature point $X_i$ is $l'_i = K'^{-T}[t]_x R K^{-1} X_i$ when each feature point is the feature point $X_i$ in the feature point pair $(X_i, X'_i)$, and the epipolar line that is in the first image and corresponding to the feature point is $X'_i$ is $l_i = -K^{-T} R^{-1} [t]_x K'^{-1} X'_i$ when each feature point is the feature point $X'_i$ in the feature point pair, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t obtaining a second distance according to the first distance of each feature point, where the second distance is an average value of first distances of all feature points, re-obtaining the relative translation distance t and the relative rotation matrix R according to a feature point, where a difference between a first distance of the feature point and the second distance is less than or equal to a specified variance threshold, and repeating the foregoing process until a difference between the first distance of each feature point in the second group of dual-camera images and an average value of the second distance is less than the specified variance threshold.

With reference to the first aspect and the foregoing seven implementations, in an eighth implementation, obtaining optimal dual-camera relative position parameters includes obtaining an average error $\bar{t}$ of the first distances of all the feature points in the second group of dual-camera images, where each group of dual-camera images in the Q groups of dual-camera images is the second group of dual-camera images, and the first distance is the distance from each feature point to the epipolar line corresponding to the feature point, the epipolar line that is in the second image and corresponding to the feature point $X_i$ is $l'_i = K'^{-T}[t]_x R K^{-1} X_i$ when each feature point is the feature point $X_i$ in the feature point pair $(X_i, X'_i)$, the epipolar line that is in the first image and corresponding to the feature point $X'_i$ is $l_i = -K^{-T} R^{-1} [t]_x K'^{-1} X'_i$ when each feature point is the feature point $X'_i$ in the feature point pair $(X_i, X'_i)$, and i is a positive integer, i≤N, $X_i$ represents the feature point $(x_i, y_i)$ of the first image in the second group of dual-camera images, $X'_i$ represents the feature point $(x'_i, y'_i)$ of the second image in the second group of dual-camera images, N represents the quantity of feature point pairs $(X_i, X'_i)$ in the second group of dual-camera images, $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, the first image is an image that is photographed by the first camera in the two cameras, and the second image is an image that is photographed by the second camera in the two cameras, and setting dual-camera relative position parameters corresponding to dual-camera images with a minimum average error $\bar{t}$ as the optimal dual-camera relative position parameters.

With reference to the first aspect and the foregoing eight implementations, in a ninth implementation, obtaining an average error $\bar{t}$ of the first distances of all the feature points in the second group of dual-camera images includes obtaining the average error $\bar{t}$ of the first distances of the feature points in the second group of dual-camera images according to $$\bar{t} = \sqrt{\frac{\sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}}}{N}},$$

where $X_i$ represents the feature point $(x_i, y_i)$ of the first image in the second group of dual-camera images, $X'_i$ represents the feature point $(x'_i, y'_i)$ of the second image in the second group of dual-camera images, the first image is an image that is photographed by the first camera in the two cameras, and the second image is an image that is photographed by the second camera in the two cameras, $l'_i = K'^{-T}[t]_x R K^{-1} X_i$ is the epipolar line that is in the second image and corresponding to $X_i$, $l_i=-K^{-T}R^{-1}[t]_xK'^{-1}X'_i$ is the epipolar line that is in the first image and corresponding to $X'_i$, $l_{ia}$ and $l_{ib}$ are respectively a first component and a second component of the vector $l_i$, $l'_{ia}$ and $l'_{ib}$ are respectively a first component and a second component of the vector $l'_i$, K is an intrinsic parameter matrix of the first camera, K' is an intrinsic parameter matrix of the second camera, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and N represents the quantity of feature point pairs $(X_i, X'_i)$ in the second group of dual-camera images.

With reference to the first aspect and the foregoing nine implementations, in a tenth implementation, M groups of dual-camera images are re-obtained when a quantity of dual-camera images that can be used for a position calculation is less than or equal to a specified threshold.

With reference to the first aspect and the foregoing ten implementations, in an eleventh implementation, after obtaining optimal dual-camera relative position parameters, the method further includes obtaining a reference average error $\bar{t}_1$ of first distances of all feature points in reference images according to the optimal dual-camera relative position parameters, where the first distance is a distance from each feature point to an epipolar line corresponding to the feature point, $X_i$ represents the feature point $(x_i, y_i)$ of the first image in the second group of dual-camera images, $X'_i$ represents the feature point $(x'_i, y'_i)$ of the second image in the second group of dual-camera images, and each group of dual-camera images in the Q groups of dual-camera images is the second group of dual-camera images, the epipolar line that is in the second image and corresponding to the feature point $X_i$ is $l'_i=K'^{-T}[t]_xRK^{-1}X_i$ when each feature point is the feature point $X'_i$ in the feature point pair $(X_i, X'_i)$, the epipolar line that is in the first image and corresponding to the feature point is $X'_i$ is $l_i=-K^{-T}R^{-1}[t]_xK'^{-1}X'_i$ when each feature point is the feature point $X'_i$ in the feature point pair $(X_i, X'_i)$, i is a positive integer, i≤N, N represents the quantity of feature point pairs $(X_i, X'_i)$ in the second group of dual-camera images, $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, the first image is an image that is photographed by the first camera in the two cameras, and the second image is an image that is photographed by the second camera in the two cameras, and the reference images are images that are photographed by the two cameras except the obtained M groups of dual-camera images, and executing the method for calculating a dual-camera position again if the reference average error $\bar{t}_i$ is greater than or equal to the preset error threshold.

According to a second aspect, the present disclosure further provides an apparatus for calculating a dual-camera position, including a collecting module configured to obtain M groups of dual-camera images, where each group of dual-camera images in the M groups includes two images that are obtained by photographing a same scene by dual cameras at the same time, and M is a positive integer, a screening module configured to screen the M groups of dual-camera images to obtain Q groups of dual-camera images that can be used to calculate the dual-camera relative position, where Q is a positive integer, and Q≤M, a position calculation module configured to obtain dual-camera relative position parameters corresponding to each group of dual-camera images in the Q groups according to each group of dual-camera images in the Q groups, and an optimization module configured to obtain optimal dual-camera relative position parameters from the Q groups of dual-camera relative position parameters.

With reference to the second aspect, in a first implementation, the relative position parameters include a relative translation distance t between the two cameras and a relative rotation matrix R between the two cameras, where $t=(t_x, t_y, t_z)^T$, and x, y, and z are respectively three orthogonal coordinate axes of a plane rectangular coordinate system.

With reference to the second aspect and the first implementation, in a second implementation, the screening module is further configured to obtain a homography matrix corresponding to a first group of dual-camera images, where each group of dual-camera images in the M groups of dual-camera images is the first group of dual-camera images, determine a projection error between two images in the first group of dual-camera images according to the homography matrix, and determine that the first group of dual-camera images are dual-camera images that can be used to calculate the dual-camera relative position when the projection error is greater than or equal to a preset error threshold.

With reference to the second aspect and the foregoing two implementations, in a third implementation, the screening module is further configured to determine the projection error e between the two images in the first group of dual-camera images according to $$e = \sqrt{\frac{\sum_{j=1}^{N'} \|HY_i - Y'_i\|_2^2}{N'}},$$

where H represents the homography matrix corresponding to the first group of dual-camera images, $Y_i$ represents a feature point $(x_i, y_i)$ of a first image in the first group of dual-camera images, $Y'_i$ represents a feature point $(x'_i, y'_i)$ of a second image in the first group of dual-camera images, j is a positive integer, j≤N', N' represents a quantity of feature point pairs $(Y_i, Y'_i)$ in the first group of dual-camera images, the first image is an image that is photographed by a first camera in the two cameras, and the second image is an image that is photographed by a second camera in the two cameras.

With reference to the second aspect and the foregoing three implementations, in a fourth implementation, the calculation module is further configured to obtain the relative translation distance t between the two cameras and the relative rotation matrix R between the two cameras according to a feature point pair $(X_i, X'_i)$ in a second group of dual-camera images, where each group of dual-camera images in the Q groups of dual-camera images is the second group of dual-camera images, $X_i$ represents a feature point $(x_i, y_i)$ of a first image in the second group of dual-camera images, $X'_i$ represents a feature point $(x'_i, y'_i)$ of a second image in the second group of dual-camera images, i is a positive integer, i≤N, N represents a quantity of feature point pairs $(X_i, X'_i)$ in the second group of dual-camera images, the first image is an image that is photographed by the first camera in the two cameras, and the second image is an image that is photographed by the second camera in the two cameras.

With reference to the second aspect and the foregoing four implementations, in a fifth implementation, the position calculation module is further configured to obtain t and R according to a non-linear optimization formula $$(t, R) = \underset{(t,R)}{\operatorname{argmin}} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2},$$

where $l_i' = K'^{-T}[t]_x R K^{-1} X_i$ is an epipolar line that is in the second image and corresponding to $X_i$, $l_i = -K^{-T} R^{-1} [t]_x K'^{-1} X_i'$ is an epipolar line that is in the first image and corresponding to $X_i'$, $l_{ia}$ and $l_{ib}$ are respectively a first component and a second component of the vector $l_i$, $l_{ia}'$ and $l_{ib}'$ are respectively a first component and a second component of the vector $l_i'$, K is an intrinsic parameter matrix of the first camera, K' is an intrinsic parameter matrix of the second camera, $[t]_x$ is an antisymmetric matrix $$\begin{bmatrix} 0 & -t_z & t_y \\ t_z & 0 & -t_x \\ -t_y & t_x & 0 \end{bmatrix}$$

defined by t, and N represents the quantity of feature point pairs $(X_i, X_i')$ in each group of dual-camera images.

With reference to the second aspect and the foregoing five implementations, in a sixth implementation, the position calculation module is further configured to remove an incorrect feature point pair $(X_i, X_i')$ in the second group of dual-camera images according to an RANSAC algorithm before obtaining t and R according to the non-linear optimization formula $$(t, R) = \underset{(t,R)}{\operatorname{argmin}} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2}.$$

With reference to the second aspect and the foregoing six implementations, in a seventh implementation, after obtaining the relative translation distance t between the two cameras and the relative rotation matrix R between the two cameras according to the feature point pair $(X_i, X_i')$ in the second group of dual-camera images, the position calculation module is further configured to obtain a first distance of each feature point in the second group of dual-camera images according to the relative translation distance t and the relative rotation matrix R, where the first distance is a distance from each feature point to an epipolar line corresponding to the feature point, the epipolar line that is in the second image and corresponding to the feature point $X_i$ is $l_i' = K'^{-T}[t]_x R K^{-1} X_i$ when each feature point is the feature point pair $X_i$ in the feature point pair $(X_i, X_i')$, the epipolar line that is in the first image and corresponding to the feature point is $X_i'$ is $l_i = -K^{-T} R^{-1} [t]_x K'^{-1} X_i'$ when each feature point is the feature point $X_i'$ in the feature point pair $(X_i, X_i')$ and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, obtain a second distance according to the first distance of each feature point, where the second distance is an average value of first distances of all feature points, re-obtain the relative translation distance t and the relative rotation matrix R according to a feature point, where a difference between the first distance of the feature point and the second distance is less than or equal to a specified variance threshold, and repeat the foregoing process until a difference between the first distance of each feature point in the second group of dual-camera images and the second distance is less than the specified variance threshold.

With reference to the second aspect and the foregoing seven implementations, in an eighth implementation, the optimization module is further configured to obtain an average error $\bar{\iota}$ of the first distances of all the feature points in the second group of dual-camera images, where each group of dual-camera images in the Q groups of dual-camera images is the second group of dual-camera images, and the first distance is the distance from each feature point to the epipolar line corresponding to the feature point, the epipolar line that is in the second image and corresponding to the feature point $X_i$ is $l_i' = K'^{-T}[t]_x R K^{-1} X_i$ when each feature point is the feature point $X_i$ in the feature point pair $(X_i, X_i')$, the epipolar line that is in the first image and corresponding to the feature point $X_i'$ is $l_i = -K^{-T} R^{-1} [t]_x K'^{-1} X_i'$ when each feature point is the feature point $X_i'$ in the feature point pair $(X_i, X_i')$, and i is a positive integer, $i \leq N$, $X_i$ represents the feature point $(x_i, y_i)$ of the first image in the second group of dual-camera images, $X_i'$ represents the feature point $(x_i', y_i')$ of the second image in the second group of dual-camera images, N represents the quantity of feature point pairs $(X_i, X_i')$ in the second group of dual-camera images, $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, the first image is an image that is photographed by the first camera in the two cameras, and the second image is an image that is photographed by the second camera in the two cameras, and set dual-camera relative position parameters corresponding to dual-camera images with a minimum average error $\bar{\iota}$ as the optimal dual-camera relative position parameters.

With reference to the second aspect and the foregoing eight implementations, in a ninth implementation, the optimization module is further configured to obtain the average error $\bar{\iota}$ of the first distances of the feature points in the second group of dual-camera images according to $$\bar{\iota} = \sqrt{\frac{\sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2}}{N}},$$

where $X_i$ represents the feature point $(x_i, y_i)$ of the first image in the second group of dual-camera images, and $X_i'$ represents the feature point of the second image in the second group of dual-camera images, $l'_i=K'^{-T}[t]_x RK^{-1}X_i$ is the epipolar line that is in the second image and corresponding to $X_i$, $l_i=-K^{-T}R^{-1}[t]_x K'^{-1}X'_i$ is the epipolar line that is in the first image and corresponding to $X'_i$, $l_{ia}$ and $l_{ib}$ are respectively a first component and a second component of the vector $l_i$, $l'_{ia}$ and $l'_{ib}$ are respectively a first component and a second component of the vector $l'_i$, K is an intrinsic parameter matrix of the first camera, K' is an intrinsic parameter matrix of the second camera, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and i is a positive integer, i≤N, and N represents the quantity of feature point pairs $(X_i, X'_i)$ in the second group of dual-camera images.

With reference to the second aspect and the foregoing nine implementations, in a tenth implementation, the collecting module is further configured to re-obtain M groups of dual-camera images when a quantity of dual-camera images that can be used for a position calculation is less than or equal to a specified threshold.

With reference to the second aspect and the foregoing ten implementations, in an eleventh implementation, after obtaining the optimal relative position parameters, the optimization module is further configured to obtain a reference average error $\bar{t}_1$ of first distances of all feature points in reference images according to the optimal dual-camera relative position parameters, where the first distance is a distance from each feature point to an epipolar line corresponding to the feature point, $X_i$ represents the feature point $(x_i, y_i)$ of the first image in the second group of dual-camera images, $X'_i$ represents the feature point $(x'_i, y'_i)$ of the second image in the second group of dual-camera images, and each group of dual-camera images in the Q groups of dual-camera images is the second group of dual-camera images, the epipolar line that is in the second image and corresponding to the feature point $X_i$ is $l'_i=K'^{-T}[t]_x RK^{-1}X_i$ when each feature point is the feature point $X_i$ in the feature point pair $(X_i, X'_i)$, the epipolar line that is in the first image and corresponding to the feature point $X'_i$ is $l_i=-K^{-T}R^{-1}[t]_x K'^{-1}X'_i$ when each feature point is the feature point $X'_i$ in the feature point pair $(X_i, X'_i)$, i is a positive integer, i≤N, N represents the quantity of feature point pairs $(X_i, X'_i)$ in the second group of dual-camera images, $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, the first image is an image that is photographed by the first camera in the two cameras, and the second image is an image that is photographed by the second camera in the two cameras, and the reference images are images that are photographed by the two cameras except the obtained M groups of dual-camera images, and execute a method for calculating a dual-camera position again if the reference average error $\bar{t}_1$ is greater than or equal to the preset error threshold.

According to a third aspect, the present disclosure provides an electronic device, including dual cameras configured to use two cameras to respectively photograph two images of a same scene at the same time, one or more processors, a memory, and one or more programs, where the one or more programs are stored in the memory and configured to be executed by the one or more processors, and the one or more programs include an instruction used to execute the foregoing method for calculating a dual-camera relative position.

According to a fourth aspect, the present disclosure provides a computer-readable storage medium in which one or more programs are stored, where the one or more programs include an instruction, and when an electronic device that includes dual cameras and multiple application programs executes the instruction, the electronic device is enabled to execute the foregoing method for calculating a dual-camera relative position, where the dual cameras are configured to use two cameras to respectively photograph two images of a same scene at the same time.

According to the method and apparatus for calculating a dual-camera position, the device, and the storage medium provided in the present disclosure, M groups of dual-camera images are first obtained, where each group of dual-camera images in the M groups includes two images that are obtained by photographing a same scene by dual cameras at the same time, the M groups of dual-camera images are screened, to obtain Q groups of dual-camera images that can be used to calculate a dual-camera relative position, dual-camera relative position parameters corresponding to each group of dual-camera images in the Q groups are obtained according to each group of dual-camera images in the Q groups, and optimal dual-camera relative position parameters are finally obtained from N groups of dual-camera relative position parameters. In this way, the dual-camera relative position can be calculated when a photographed scene is relatively difficult to recognize.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

FIG. 5 is a schematic flowchart of performing a checking calculation on optimal dual-camera relative position parameters according to a second embodiment of the present disclosure;

FIG. 6 is a schematic structural diagram of an apparatus for calculating a dual-camera relative position according to a third embodiment of the present disclosure.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
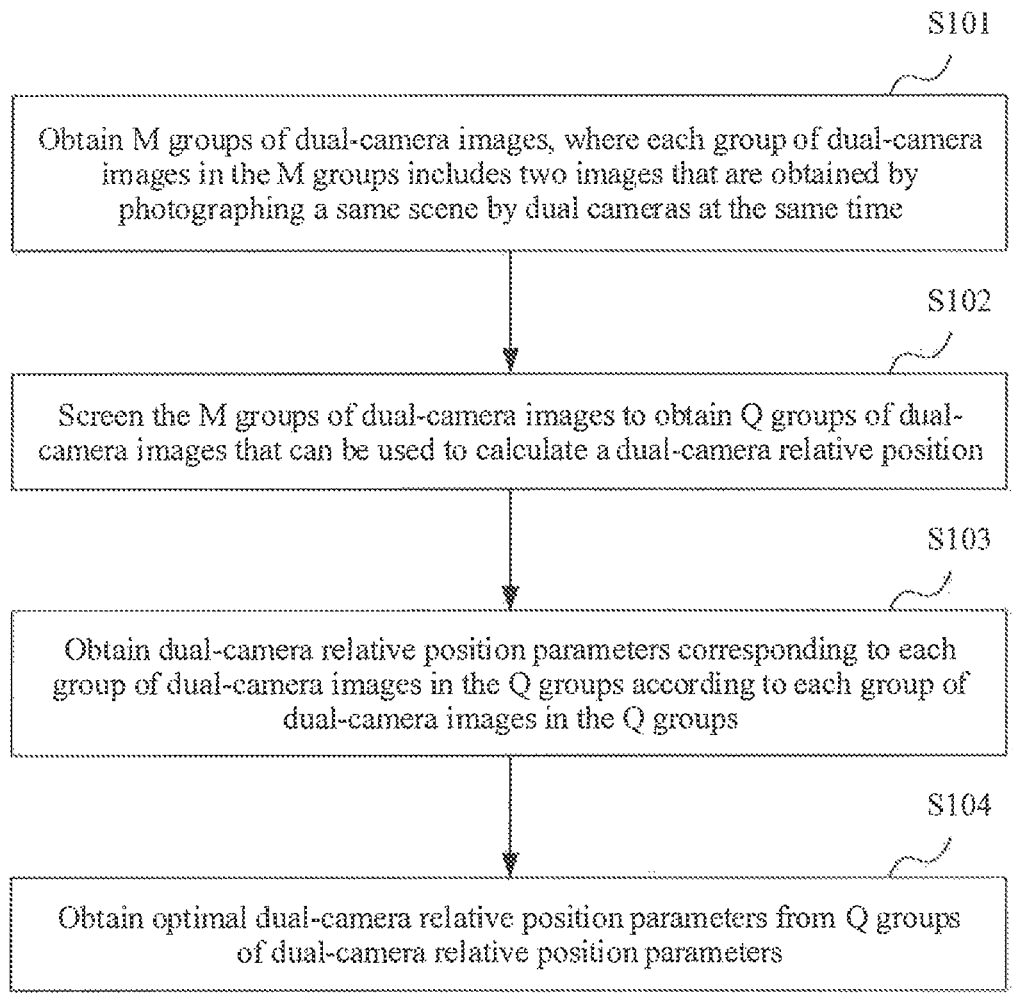
FIG. 1 is a schematic flowchart of a method for calculating a dual-camera position according to a first embodiment of the present disclosure.

FIG. 1 is a schematic flowchart of a method for calculating a dual-camera position according to a first embodiment of the present disclosure. As shown in FIG. 1, the method for calculating a dual-camera position provided in this embodiment includes the following steps.

Step S101: Obtain M groups of dual-camera images, where each group of dual-camera images in the M groups includes two images that are obtained by photographing a same scene by dual cameras at the same time.

When the dual cameras are used to shoot an image, two cameras included in the dual cameras may be generally disposed on the left and the right, or the like. There is a specific distance between the two cameras, and there may be specific angular displacement. The M groups of dual-camera images are first obtained when the dual cameras are used for photographing, where M is a positive integer, and a value of M may be preconfigured. Each group of dual-camera images includes images that are obtained by photographing a same scene by the two cameras at the same time. The images that are respectively photographed by the two cameras are basically consistent, except for a difference in perspectives of the cameras. It may be defined as follows. A first image is an image that is photographed by a first camera in the two cameras, and a second image is an image that is photographed by a second camera in the two cameras.

Step S102: Screen the M groups of dual-camera images to obtain Q groups of dual-camera images that can be used to calculate a dual-camera relative position.

Because dual-camera images that are photographed are not necessarily suitable to be used to obtain the dual-camera relative position, after the M groups of dual-camera images are obtained, the M groups of dual-camera images need to be further screened to obtain the Q groups of dual-camera images that can be used to calculate the dual-camera relative position from the M groups of dual-camera images in order to perform a subsequent dual-camera position calculation process, where Q is a positive integer, and Q≤M.

Further, when a quantity of dual-camera images that can be used for a position calculation is less than a specified threshold, multiple groups of dual-camera images need to be further re-obtained in order to perform the calculation again.

Screening the M groups of dual-camera images to obtain the Q groups of dual-camera images that can be used to calculate the dual-camera relative position may include the following steps.

For each group of images in the M groups of dual-camera images perform the following steps.

Step (1): Obtain a homography matrix corresponding to a first group of dual-camera images, where each group of dual-camera images in the M groups of dual-camera images is the first group of dual-camera images.

Step (2): Determine a projection error between two images in the first group of dual-camera images according to the homography matrix.

When the projection error is greater than or equal to a preset error threshold, it is determined that the group of dual-camera images are dual-camera images that can be used to calculate the dual-camera relative position.

Each group of dual-camera images in the M groups of dual-camera images is defined as the first group of dual-camera images. For each group of dual-camera images in the M groups of dual-camera images, the foregoing manner can be used to determine whether the group of dual-camera images can be used to calculate the dual-camera relative position, and all dual-camera images that can be used to calculate the relative position are added into the Q groups of dual-camera images.

It should be noted that ordinal numbers such as "first" and "second" that are mentioned in this embodiment of the present disclosure are merely used for differentiation, unless the ordinal numbers definitely represent a sequence according to the context.

Further, determining the projection error between the two images in each group of dual-camera images according to the homography matrix may include determining the projection error e between the two images in the first group of dual-camera images according to $$e = \sqrt{\frac{\sum_{j=1}^{N} \|HY_i - Y'_i\|_2^2}{N'}}.$$

There is a feature point in each group of dual-camera images. A feature point may also be referred as a significant point or key point that is used to indicate a significant feature of an image. The feature point may be an extreme point of an image, an end point of a line segment, a point of a curve at which curvature or an attribute in a horizontal direction or vertical direction is maximal, or the like. Because each group of dual-camera images includes two images corresponding to a same scene, a feature point of one image in the dual-camera images has a corresponding feature point in the other image. If $Y_i$ is used to represent coordinates $(x_i, y_i)$ of a feature point in the first image in the dual-camera images, and $Y'_i$ is used to represent coordinates $(x'_i, y'_i)$ of the corresponding feature point in the second image in the dual-camera images, there is a specific correspondence between $Y_i$ and $Y'_i$. The correspondence represents a space position relationship between feature points of the two images, and may be represented using a feature point pair $(Y_i, Y'_i)$ of each group of images in the M groups of dual-camera images. A homography matrix H corresponding to the dual-camera images describes the correspondence.

Further, for a group of dual-camera images, a homography matrix H of the group of dual-camera images meets the relationship of $$\begin{bmatrix} x'_1 \\ y'_1 \\ 1 \end{bmatrix} = H * \begin{bmatrix} x_1 \\ y_1 \\ 1 \end{bmatrix}$$

The homography matrix H corresponding to the group of dual-camera images may be obtained by solving the foregoing equation.

A projection error e between two images in the group of dual-camera images is determined according to $$e = \sqrt{\frac{\sum_{j=1}^{N} \|HY_i - Y_i'\|_2^2}{N'}},$$

after the homography matrix H corresponding to the group of dual-camera images is obtained. A projection error e between two images in each group of dual-camera images may be obtained in a same manner.

H represents the homography matrix corresponding to the first group of dual-camera images, $Y_i$ represents a feature point $(x_i, y_i)$ of the first image in the first group of dual-camera images, $Y'_i$ represents a feature point $(x'_i, y'_i)$ of the second image in the first group of dual-camera images, j is a positive integer, $j \leq N'$, N' represents a quantity of feature point pairs $(Y_i, Y'_i)$ in the first group of dual-camera images.

When the projection error e is greater than or equal to the preset error threshold, it is determined that the group of dual-camera images are dual-camera images that can be used for the position calculation. Further, after the projection error e between the two images in each group of dual-camera images is obtained according to the foregoing steps, the projection error e may be compared with the preset error threshold. When the projection error e is greater than or equal to the preset error threshold, it may be determined that the group of images are dual-camera images that meet a preset condition and that can be used to calculate the dual-camera relative position, and then the group of dual-camera images can be used for a subsequent dual-camera position calculation. When the projection error e is less than the preset error threshold, it is determined that the group of images does not meet a preset condition and cannot be used for a subsequent calculation. The Q groups of dual-camera images that can be used to calculate the dual-camera relative position may be obtained by screening each group of dual-camera images in the M groups of dual-camera images in a same manner.

It should be noted that, in the foregoing calculation of the projection error e between the two images according to the homography matrix, it should be ensured that a same camera is always used as a reference to calculate a projection error of the other camera relative to the camera. In addition, a value of the preset error threshold varies according to different reference cameras. For example, the first camera, that is, a left-side camera, is always used as a reference to calculate a projection error from the second camera, that is, a right-side camera, to the left-side camera, and the calculated projection error is compared with a preset error threshold corresponding to the reference left-side camera in order to obtain, by means of screening, the dual-camera images that can be used to calculate the dual-camera relative position.

Step S103: Obtain dual-camera relative position parameters corresponding to each group of dual-camera images in the Q groups according to each group of dual-camera images in the Q groups.

After the Q groups of dual-camera images that can be used to calculate the dual-camera relative position are obtained, the dual-camera relative position parameters corresponding to each group of dual-camera images may be obtained according to each group of dual-camera images that can be used to calculate the dual-camera relative position. The dual-camera relative position parameters corresponding to the dual cameras represent a space position relationship between the two cameras in the dual cameras. Further, the dual-camera relative position parameters corresponding to the dual cameras include a relative translation distance t between the two cameras in the dual cameras and a relative rotation matrix R between the two cameras, where $t = (t_x, t_y, t_z)$, and x, y, and z are respectively three orthogonal coordinate axes of a plane rectangular coordinate system. The relative translation distance t between the two cameras in the dual cameras represents coordinate differences between the two cameras in three different coordinate-axis directions an x-axis, a y-axis, and a z-axis in the plane rectangular coordinate system. The relative rotation matrix R represents rotation angles between the two cameras respectively relative to an x-axis, a y-axis, and a z-axis in the plane rectangular coordinate system. Obtaining the dual-camera relative position parameters corresponding to the dual-camera images according to each group of dual-camera images that can be used for the position calculation includes obtaining the relative translation distance t between the two cameras and the relative rotation matrix R between the two cameras according to a feature point pair $(X_i, X'_i)$ in a second group of dual-camera images, where each group of dual-camera images in the Q groups of dual-camera images is the second group of dual-camera images.

For differentiation from each group of dual-camera images in the foregoing M groups of dual-camera images, in the feature point pair $(X_i, X'_i)$, of each group of dual-camera images in the Q groups, $X_i$ is used to represent a feature point $(x_i, y_i)$ of a first image in each group of dual-camera images in the Q groups, and $X'_i$ is used to represent a feature point $(x'_i, y'_i)$ of a second image in each group of dual-camera images in the Q groups. The feature point pair $(X_i, X'_i)$ in the dual-camera images represents a specific correspondence between $X_i$ and $X'_i$. The relative translation distance t between the two cameras and the relative rotation matrix R between the two cameras can be calculated using the feature point pair $(X_i, X'_i)$.

It should be noted that, the foregoing $X_i$, $X'_i$, and $Y_i$, $Y'_i$ are merely set for differentiation between a feature point in an image of the M groups of dual-camera images and a feature point in an image of the Q groups of dual-camera images, and there is no actual difference between physical meanings represented by $X_i$ and $X'_i$, and by feature points $Y_i$ and $Y'_i$ of each group of dual-camera images in the foregoing M groups.

Further, the step of obtaining the relative translation distance t between the two cameras and the relative rotation matrix R between the two cameras according to the feature point pair $(X_i, X'_i)$ in the second group of dual-camera images may include obtaining t and R according to a non-linear formula.

Further, the non-linear formula is $$(t, R) = \underset{(t,R)}{\arg\min} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2},$$

where $l'_i = K'^{-T}[t]_x R K^{-1} X_i$ is an epipolar line that is in the second image and corresponding to $X_i$, $l_i = -K^{-T} R^{-1}[t]_x K'^{-1} X'_i$ is an epipolar line that is in the first image and corresponding to $X'_i$, and $l_{ia}$ and $l_{ib}$ are respectively a first component and a second component of the vector $l_i$, $l'_{ia}$ and $l'_{ib}$ are respectively a first component and a second component of the vector $l'_i$, K is an intrinsic parameter matrix of the first camera, K' is an intrinsic parameter matrix of the second camera, $[t]_x$ is an antisymmetric matrix $$\begin{bmatrix} 0 & -t_z & t_y \\ t_z & 0 & -t_x \\ -t_y & t_x & 0 \end{bmatrix}$$

defined by t, i is a positive integer, i≤N, and N represents a quantity of feature point pairs $(X_i, X'_i)$ in each group of dual-camera images.

The first component $l_{ia}$ and the second component $l_{ib}$ of the vector $l_i$ are obtained by resolving the vector $l_i$ herein. For example, $l_{ia}$ and $l_{ib}$ may be respectively components generated in two orthogonal directions after the vector $l_i$ is orthogonally resolved. Likewise, the first component $l'_{ia}$ and the second component $l'_{ib}$ of the vector $l'_i$ may be two components generated in orthogonal directions after the vector $l'_i$ is orthogonally resolved.

Optionally, before t and R are obtained, an incorrect feature point pair $(X_i, X'_i)$ in the dual-camera images may be removed according to an RANSAC algorithm. Further, the incorrect feature point pair $(X_i, X'_i)$ is found using a known RANSAC algorithm. The incorrect feature point pair is not applicable to the subsequent calculation. An estimated result is first obtained from some feature point pairs $(X_i, X'_i)$ using the RANSAC algorithm. For example, the estimated result is a fundamental matrix fundamental matrix or an essential matrix essential matrix that matches a correct matching point. Then the estimated result is tested using all feature point pairs $(X_i, X'_i)$. It is assumed that all the feature point pairs include inliers and outliers, the inliers approximately fit a line on which the estimated result is located, and the outliers are away from the estimated result line. In this case, iteration may be performed repeatedly to obtain a better estimated result, and a feature point pair that does not meet the estimated result is abandoned.

After the relative translation distance t and the relative rotation matrix R are obtained, a checking calculation needs to be further performed on the feature point using the obtained relative translation distance t and relative rotation matrix R in order to obtain more accurate t and R. A checking calculation process includes the following steps.

Step (1): Obtain a first distance of each feature point in the second group of dual-camera images according to the relative translation distance t and the relative rotation matrix R, where the first distance is a distance from each feature point to an epipolar line corresponding to the feature point, the epipolar line that is in the second image and corresponding to the feature point $X_i$ in the first image is $l'_i = K'^{-T}[t]_x RK^{-1}X_i$ when each feature point is the feature point $X_i$ in the feature point pair $(X_i, X'_i)$, and the epipolar line that is in the first image and corresponding to the feature point $X'_i$ in the second image is $l_i = -K^{-T}R^{-1}[t]_x K'^{-1}X'_i$ when each feature point is the feature point $X'_i$ in the feature point pair $(X_i, X'_i)$.

Step (2): Obtain a second distance according to the first distance of each feature point, where the second distance is an average value of first distances of all feature points.

Step (3): Re-obtain the relative translation distance t and the relative rotation matrix R according to a feature point, where a difference between a first distance of the feature point and the second distance is less than or equal to a specified variance threshold.

When a difference between a first distance from a feature point to an epipolar line corresponding to the feature point and the second distance is greater than the specified variance threshold, it indicates that a difference between the feature point and remaining feature points is relatively large. In this case, the feature point should be abandoned, and the relative translation distance t and the relative rotation matrix R between the two cameras are re-obtained using the remaining feature points.

Then the foregoing steps are performed repeatedly and a calculation result is checked, until a difference between the first distance of each feature point in the second group of dual-camera images and the second distance is less than the specified variance threshold.

Step S104: Obtain optimal dual-camera relative position parameters from Q groups of dual-camera relative position parameters.

Obtaining the optimal dual-camera relative position parameters includes the following steps.

Step (1): Obtain an average error $\bar{t}$ of the first distances of all the feature points in the second group of dual-camera images, where each group of dual-camera images in the Q groups of dual-camera images is the second group of dual-camera images.

The epipolar line that is in the second image and corresponding to the feature point $X_i$ in the first image is $l'_i = K'^{-T}[t]_x RK^{-1}X_i$, and the epipolar line that is in the first image and corresponding to the feature point $X'_i$ in the second image is $l_i = -K^{-T}R^{-1}[t]_x K'^{-1}X'_i$.

Further, the average error $\bar{t}$ of the first distances of all the feature points in the second group of dual-camera images may be obtained according to $$\bar{t} = \sqrt{\frac{\sum_{i=1}^{N} \frac{\|X_i^T l'_i\|_2^2}{l'^2_{ia} + l'^2_{ib}} + \frac{\|X_i^T l_i\|_2^2}{l^2_{ia} + l^2_{ib}}}{N}},$$

where $X_i$ represents the feature point $(x_i, y_i)$ of the first image in the second group of dual-camera images, and $X'_i$ represents the feature point $(x'_i, y'_i)$ of the second image in the second group of dual-camera images, $l'_i = K'^{-T}[t]_x RK^{-1}X_i$, is the epipolar line that is in the second image and corresponding to $X'_i$, $l_i = -K^{-T}R^{-1}[t]_x K'^{-1}X'_i$ is the epipolar line that is in the first image and corresponding to $X'_i$, $l_{ia}$ and $l_{ib}$ are respectively the first component and the second component of the vector $l_i$, $l'_{ia}$ and $l'_{ib}$ are respectively the first component and the second component of the vector $l'_i$, K is the intrinsic parameter matrix of the first camera, K' is the intrinsic parameter matrix of the second camera, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and N represents the quantity of feature point pairs $(X_i, X'_i)$ in the second group of dual-camera images.

Step (2) Set dual-camera relative position parameters with a minimum average error $\bar{t}$ as the optimal dual-camera relative position parameters.

The optimal dual-camera position parameters may be obtained after the foregoing steps are performed. The optimal dual-camera position parameters represent a relative position relationship between one camera and the other camera in the dual cameras.

Further, after the optimal dual-camera relative position parameters are obtained, the method further includes obtaining a reference average error $\bar{t}_1$ of first distances of all feature points in reference images according to the optimal dual-camera relative position parameters, where the first distance is a distance from each feature point to an epipolar line corresponding to the feature point, the epipolar line that is in the second image and corresponding to the feature point $X_i$ is $l'_i = K'^{-T}[t]_x R K^{-1} X_i$ each feature point is the feature point $X_i$ in the feature point pair $(X_i, X'_i)$, the epipolar line that is in the first image and corresponding to the feature point $X'_i$ is $l_i = -K^{-T} R^{-1} [t]_x K'^{-1} X'_i$ when each feature point is the feature point $X'_i$ in the feature point pair $(X_i, X'_i)$, and the reference images are images that are photographed by the two cameras except the M groups of dual-camera images, and executing the method for calculating a dual-camera position again if the reference average error $\bar{t}_1$ is greater than or equal to the preset error threshold.

In this embodiment, M groups of dual-camera images are first obtained, where each group of dual-camera images in the M groups includes two images that are obtained by photographing a same scene by the dual cameras at the same time. The M groups of dual-camera images are screened to obtain Q groups of dual-camera images that can be used to calculate a dual-camera relative position, where both M and Q are positive integers, and Q≤M, dual-camera relative position parameters corresponding to each group of dual-camera images in the Q groups are obtained according to each group of dual-camera images in the Q groups, and optimal dual-camera relative position parameters are finally obtained from Q groups of dual-camera relative position parameters. In this way, the dual-camera relative position can be calculated when a photographed scene is relatively difficult to recognize.

Figure 2:
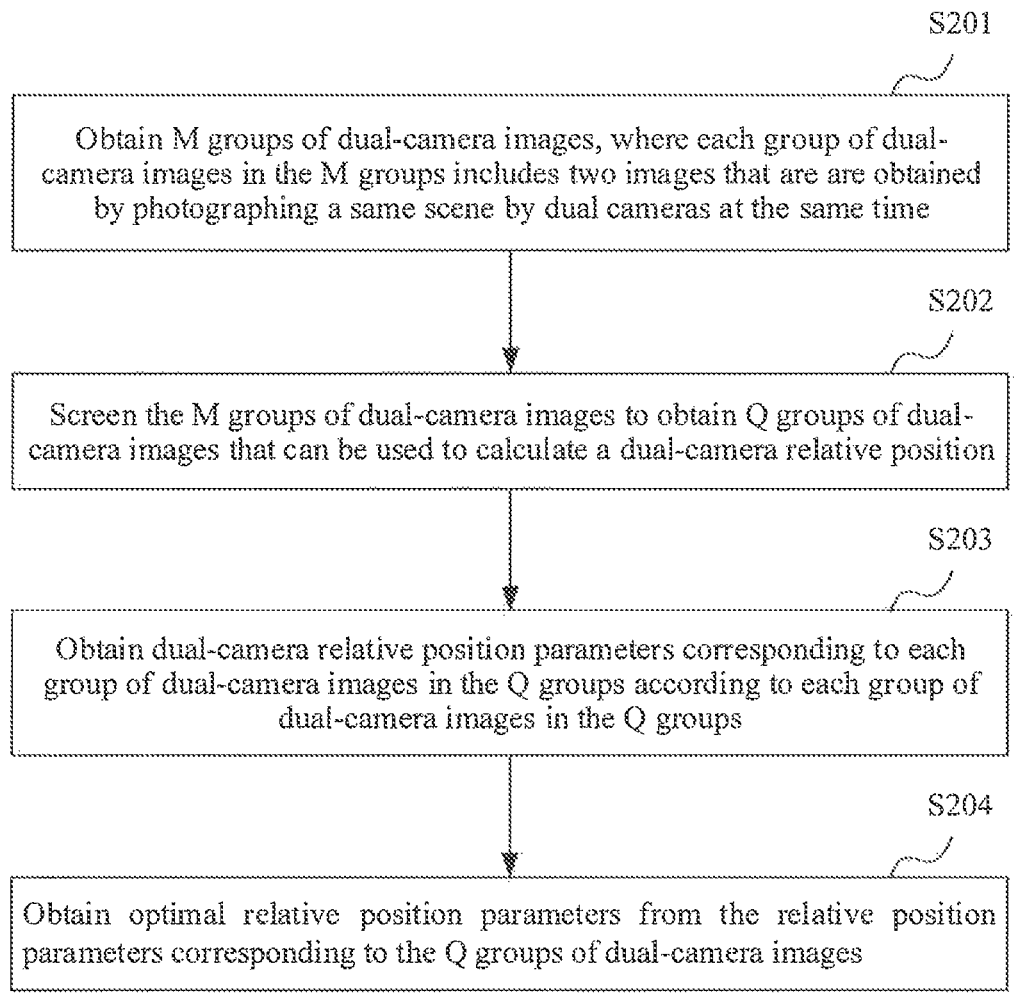
FIG. 2 is a schematic flowchart of a method for calculating a dual-camera position according to a second embodiment of the present disclosure.

FIG. 2 is a schematic flowchart of a method for calculating a dual-camera position according to a second embodiment of the present disclosure. In this embodiment, specific steps of a procedure of the method for calculating a dual-camera position are provided based on the foregoing embodiment. As shown in FIG. 2, the method for calculating a dual-camera position provided in this embodiment includes the following steps.

Step S201: Obtain M groups of dual-camera images, where each group of dual-camera images in the M groups includes two images that are obtained by photographing a same scene by dual cameras at the same time.

When the dual cameras are used for photographing, the two cameras may respectively photograph a same scene at the same time in order to obtain two images. Ranges and content of photographed scenes in the two images are basically the same, except for a difference in perspectives.

Generally, a quantity of groups of the obtained dual-camera images may be set using a preset program. For example, it may be set that M groups of images are captured by the dual cameras, and a value of M may be set in a configuration file. Screening and calculation are performed on the M groups of images in a subsequent step after the M groups of images are obtained.

Step S202: Screen the M groups of dual-camera images to obtain Q groups of dual-camera images that can be used to calculate a dual-camera relative position.

Because dual-camera images that are photographed are not necessarily suitable to be used to calculate the dual-camera relative position, after multiple groups of dual-camera images are obtained, each group of dual-camera images needs to be further screened to obtain multiple groups of dual-camera images that meet a preset condition and can be used to calculate the dual-camera relative position in order to perform a subsequent dual-camera position calculation process. For example, a subsequent dual-camera position calculation is not applicable to the following several cases:

(1) A photographed scene or object is excessively far from the cameras.

(2) A photographed scene or a main part of a photographed scene is a plane or nearly a plane.

(3) There is no object with rich texture in a photographed scene.

In the foregoing cases, scenes or objects photographed by the two cameras in the dual cameras are relatively similar, relatively low in contrast, or the like, that is, it is difficult to differentiate between objects photographed by the two cameras. Therefore, low-contrast images that cannot be used to implement the position calculation need to be screened out using a parameter, such as a projection error, that can represent similarity between the two images, thereby screening out the foregoing scenes or objects that cannot be used for the calculation.

Figure 3:
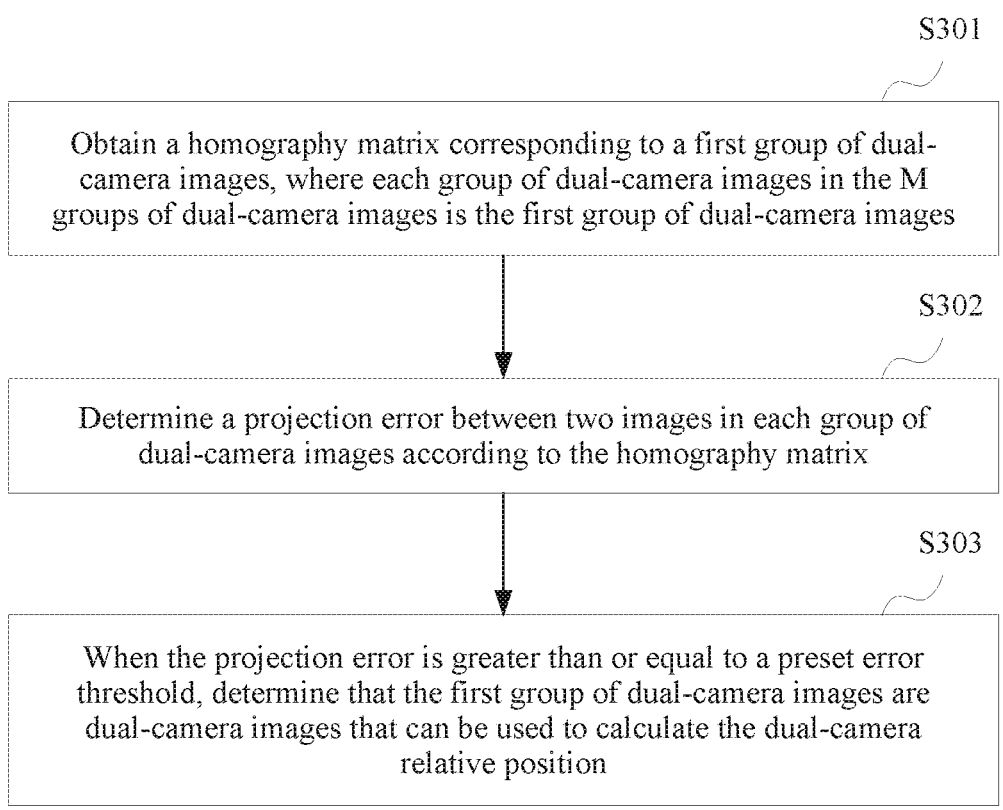
FIG. 3 is a schematic flowchart of screening dual-camera images according to a second embodiment of the present disclosure.

FIG. 3 is a schematic flowchart of screening each group of dual-camera images according to a second embodiment of the present disclosure. As shown in FIG. 3, the step may further include the following steps.

Step S301: Obtain a homography matrix corresponding to a first group of dual-camera images, where each group of dual-camera images in the M groups of dual-camera images is the first group of dual-camera images.

The homography matrix H meets the relationship of $$\begin{bmatrix} x'_1 \\ y'_1 \\ 1 \end{bmatrix} = H * \begin{bmatrix} x_1 \\ y_1 \\ 1 \end{bmatrix},$$

where $$H = \begin{bmatrix} H_{11} & H_{12} & H_{13} \\ H_{21} & H_{22} & H_{23} \\ H_{31} & H_{32} & H_{33} \end{bmatrix}.$$

Expand the foregoing relational expression to obtain $x'_1(H_{31}x_1 + H_{32}y_1 + H_{33}) = H_{11}x_1 + H_{12}y_1 + H_{13}$ and $y'_1(H_{31}x_1 + H_{32}y_1 + H_{33}) = H_{21}x_1 + H_{22}y_1 + H_{23}$ and then solve them to obtain $Bh=0$, where $h = (H_{11}, H_{12}, H_{13}, H_{21}, H_{22}, H_{23}, H_{31}, H_{32}, H_{33})^T$, $$B = \begin{pmatrix} b^T_{x_1} \\ b^T_{y_1} \\ \vdots \\ b^T_{x_N} \\ b^T_{y_N} \end{pmatrix},$$

$b_x = (-x_1, -y_1, -1, 0, 0, 0, x'_1 X_1, x'_1 y_1, x'_2)^T$, $b_y = (0, 0, 0, -x_1, -y_1, -1, y'_1 x_1, y'_1 y_1, y'_1)^T$, and N' represents a quantity of feature point pairs $(Y_i, Y'_i)$ in the first group of dual-camera images.

After the feature point pairs are obtained, h may be obtained according to the least square method or the gradient descent method, and then the correlation matrix H is obtained.

Step S302: Determine a projection error between two images in each group of dual-camera images according to the homography matrix.

Further, the projection error e may be determined according to a formula $$e = \sqrt{\frac{\sum_{j=1}^{N} \|HY_i - Y'_i\|_2^2}{N'}},$$

where H represents the homography matrix corresponding to each group of dual-camera images, $Y_i$ represents a feature point $(x_i, y_i)$ of a first image in the dual-camera images, $Y'_i$ represents a feature point $(x'_i, y'_i)$ of a second image in the dual-camera images, j is a positive integer, j≤N', N' represents the quantity of feature point pairs $(Y_i, Y'_i)$ in each group of dual-camera images, the first image is an image that is photographed by a first camera in the two cameras, and the second image is an image that is photographed by a second camera in the two cameras.

Step S303: When the projection error is greater than or equal to a preset error threshold, determine that the first group of dual-camera images are dual-camera images that can be used to calculate the dual-camera relative position.

After the projection error e between the two images in the first group of dual-camera images is obtained according to the foregoing steps, the projection error e may be compared with the preset error threshold. When the projection error e is greater than or equal to the preset error threshold, it may be determined that the first group of dual-camera images are dual-camera images that can be used to calculate the dual-camera relative position, and then the first group of dual-camera images can be used for a subsequent dual-camera position calculation. When the projection error e is less than the preset error threshold, it is determined that the first group of images does not meet a preset condition and cannot be used for a subsequent dual-camera relative position calculation.

Further, when a quantity of dual-camera images that can be used to calculate the dual-camera relative position is less than or equal to a specified threshold, M groups of dual-camera images need to be re-obtained to perform a calculation again in order to avoid a problem being caused due to insufficient samples in the subsequent calculation. For example, if there are Q groups of dual-camera images that can be used for a position calculation, and the specified threshold is L, when Q≤L, it indicates that there are excessively few appropriate images in the obtained Q groups of images, and M groups of images need to be re-captured.

Step S203: Obtain dual-camera relative position parameters corresponding to each group of dual-camera images in the Q groups according to each group of dual-camera images in the Q groups.

Figure 4:
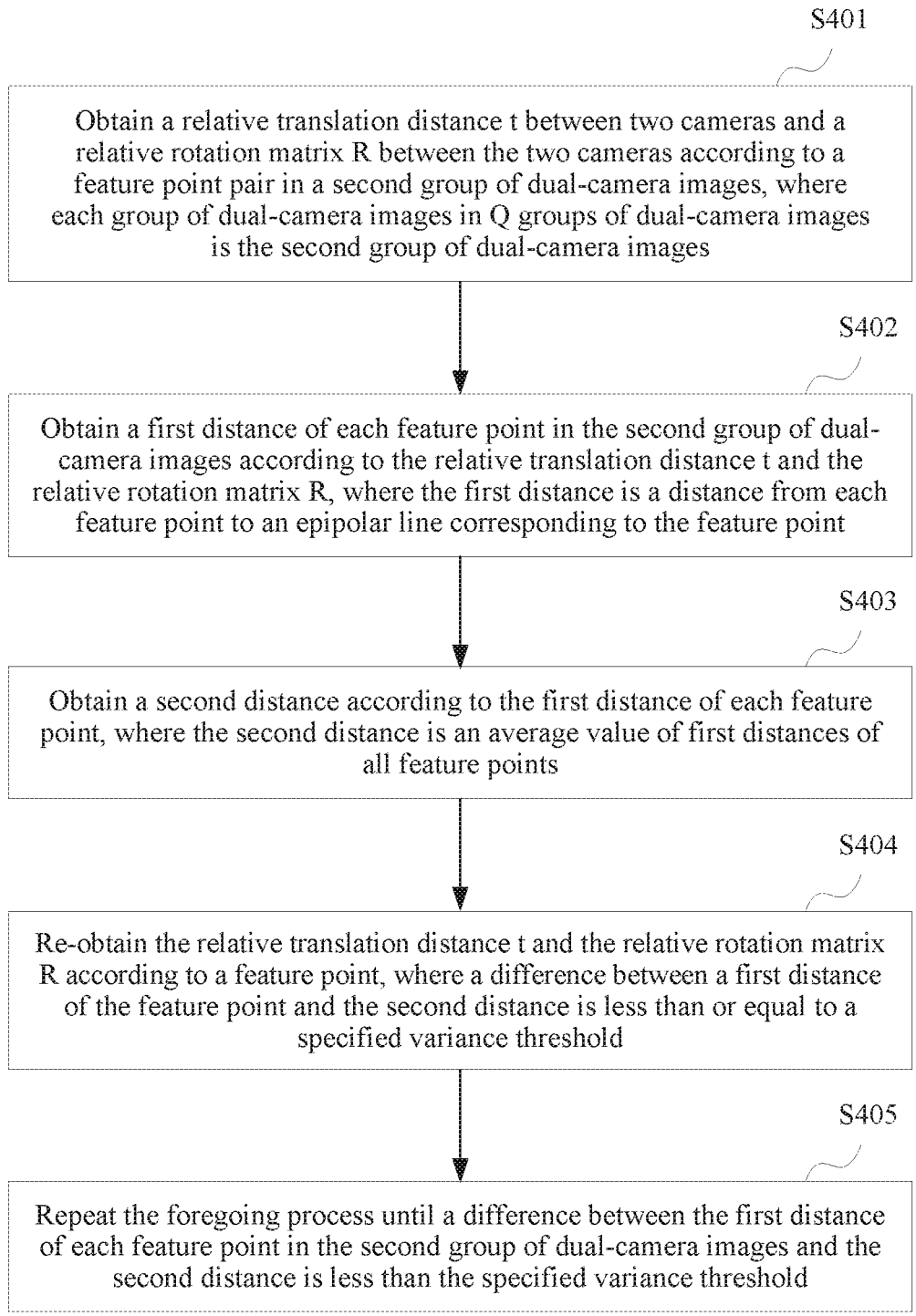
FIG. 4 is a schematic flowchart of obtaining dual-camera relative position parameters corresponding to dual-camera images according to a second embodiment of the present disclosure.

After each group of dual-camera images in the Q groups that can be used to calculate the dual-camera relative position parameters is obtained, the dual-camera relative position parameters corresponding to the dual-camera images may be obtained according to each group of dual-camera images that can be used for a position calculation. FIG. 4 is a schematic flowchart of obtaining dual-camera relative position parameters corresponding to dual-camera images according to a second embodiment of the present disclosure. As shown in FIG. 4, obtaining the dual-camera relative position parameters corresponding to the dual-camera images according to each group of dual-camera images in the Q groups includes the following steps.

Step S401: Obtain a relative translation distance t between the two cameras and a relative rotation matrix R between the two cameras according to a feature point pair in a second group of dual-camera images, where each group of dual-camera images in the Q groups of dual-camera images is the second group of dual-camera images.

Further, the feature point pair in the second group of dual-camera images is $(X_i, X'_i)$, $X_i$ represents a feature point $(x_i, y_i)$ of a first image in the second group of dual-camera images, $X'_i$ represents a feature point $(x'_i, y'_i)$ of a second image in the second group of dual-camera images, and $t=(t_x, t_y, t_z)^T$.

Further, the feature point pair $(X_i, X'_i)$ in the dual-camera images meets the relationship of $x'_i{}^T F x_i = 0$.

There is a known relationship $F = K'^{-T}[t]_x R K^{-1}$, where K is an intrinsic parameter matrix of the first camera, K' is an intrinsic parameter matrix of the second camera, and $[t]_x$ is an antisymmetric matrix $$\begin{bmatrix} 0 & -t_z & t_y \\ t_z & 0 & -t_x \\ -t_y & t_x & 0 \end{bmatrix}$$

defined by t.

Therefore, the relative translation distance t between the two cameras and the relative rotation matrix R between the two cameras may be obtained using intrinsic parameter matrices K and K' of the two cameras and the feature point pair $(X_i, X'_i)$.

The step may include following steps.

Step (1): Remove an incorrect feature point pair $(X_i, X'_i)$ in the dual-camera images according to an RANSAC algorithm.

This step is an optional step, and a specific process of this step is finding and deleting the incorrect feature point pair $(X_i, X'_i)$ using a known RANSAC algorithm in order to ensure a subsequent calculation.

Step (2): Obtain t and R according to $$(t, R) = \underset{(t,R)}{\operatorname{argmin}} \sum_{i=1}^{N} \frac{\|X'^T_i l'_i\|_2^2}{l'^2_{ia} + l'^2_{ib}} + \frac{\|X^T_i l_i\|_2^2}{l^2_{ia} + l^2_{ib}},$$

where $l'_i = K'^{-T}[t]_x R K^{-1} X_i$ is an epipolar line that is in the second image and corresponding to $X_i$, $l_i = -K^{-T} R^{-1}[t]_x K'^{-1} X'_i$ is an epipolar line that is in the first image and corresponding to $X'_i$, $l_{ia}$ and $l_{ib}$ are respectively a first component and a second component of the vector $l_i$, $l'_{ia}$ and $l'_{ib}$ are respectively a first component and a second component of the vector $l'_i$, K is the intrinsic parameter matrix of the first camera, K' is the intrinsic parameter matrix of the second camera, $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and N represents the quantity of feature point pairs ($X_i$, $X'_i$) in each group of dual-camera images.

Further, in the foregoing formula, the first component $l_{ia}$ and the second component $l_{ib}$ of the vector $l_i$ may be respectively components in different directions after the vector $l_i$ is resolved, for example, components generated in two orthogonal directions after the vector $l_i$ is orthogonally resolved. Likewise, the first component $l'_{ia}$ and the second component $l'_{ib}$ of the vector $l'_i$ may be two components generated in orthogonal directions after the vector $l'_i$ is orthogonally resolved.

The non-linear least square method, such as the Levenberg-Marquardt algorithm, may be used to solve the foregoing equation.

Step S402: Obtain a first distance of each feature point in the second group of dual-camera images according to the relative translation distance t and the relative rotation matrix R, where the first distance is a distance from each feature point to an epipolar line corresponding to the feature point.

Further, the epipolar line that is in the second image and corresponding to the feature point $X_i$ is $l'_i = K'^{-T}[t]_x R K^{-1} X_i$ when each feature point is the feature point $X_i$ in the feature point pair ($X_i$, $X'_i$), and the epipolar line that is in the first image and corresponding to the feature point $X'_i$ is $l_i = -K^{-T} R^{-1}[t]_x K'^{-1} X'_i$ when each feature point is the feature point $X'_i$ in the feature point pair ($X_i$, $X'_i$).

Step S403: Obtain a second distance according to the first distance of each feature point, where the second distance is an average value of first distances of all feature points.

The epipolar line corresponding to the feature point $X_i$ is $l'_i = K'^{-T}[t]_x R K^{-1} X_i$, and the epipolar line corresponding to the feature point $X'_i$ is $l_i = -K^{-T} R^{-1}[t]_x K'^{-1} X'_i$.

Step S404: Re-obtain the relative translation distance t and the relative rotation matrix R according to a feature point, where a difference between a first distance of the feature point and the second distance is less than or equal to a specified variance threshold.

When the difference between the first distance and the second distance is greater than the specified variance threshold, for example, when the specified variance threshold is three times the average distance, it indicates that a difference between the feature point and remaining feature points is relatively large. In this case, the feature point should be abandoned, and the relative translation distance t and the relative rotation matrix R that are between the two cameras are re-obtained using the remaining feature points, where a difference between a first distance of the feature point and the second distance is less than or equal to the specified variance threshold.

Step S405: Repeat the foregoing process until a difference between the first distance of each feature point in the second group of dual-camera images and the second distance is less than the specified variance threshold.

In the step, steps S401 to S404 are repeated and a calculation result is checked, until a difference between the second distance and the first distance from each feature point in the second group of dual-camera images to an epipolar line corresponding to the feature point is less than the specified variance threshold. In this case, it indicates that distances from all feature points in the dual-camera images to epipolar lines corresponding to the feature points are almost consistent.

Step S204: Obtain optimal relative position parameters from the relative position parameters corresponding to the Q groups of dual-camera images.

Obtaining the optimal relative position parameters includes the following steps.

Step (1): Obtain an average error $\bar{t}$ of the first distances of the feature points in the second group of dual-camera images according to $$\bar{t} = \sqrt{\frac{\sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}}}{N}},$$

where $X_i$ represents the feature point ($x_i$, $y_i$) of the first image in the second group of dual-camera images, and $X'_i$ represents the feature point ($x'_i$, $y'_i$) of the second image in the second group of dual-camera images, $l'_i = K'^{-T}[t]_x R K^{-1} X_i$ is the epipolar line that is in the second image and corresponding to $X_i$, $l_i = -K^{-T} R^{-1}[t]_x K'^{-1} X'_i$ is the epipolar line that is in the first image and corresponding to $X'_i$, $l_{ia}$ and $l_{ib}$ are respectively the first component and the second component of the vector $l_i$, $l'_{ia}$ and $l'_{ib}$ are respectively the first component and the second component of the vector $l'_i$, K is the intrinsic parameter matrix of the first camera, K' is the intrinsic parameter matrix of the second camera, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and N represents the quantity of feature point pairs ($X_i$, $X'_i$) in the second group of dual-camera images.

Step (2): Set relative position parameters corresponding to dual-camera images with a minimum average error $\bar{t}$ as the optimal dual-camera relative position parameters.

The optimal dual-camera position parameters may be obtained after the foregoing steps are performed.

After the optimal dual-camera relative position parameters corresponding to the dual-camera images are obtained, a checking calculation process needs to be performed, to ensure that the optimal dual-camera relative position parameters are effective. FIG. 5 is a schematic flowchart of performing a checking calculation on optimal dual-camera relative position parameters according to a second embodiment of the present disclosure. As shown in FIG. 5, performing the checking calculation on the optimal dual-camera relative position parameters may include the following steps.

Step S501: Obtain a reference average error of first distances of all feature points in reference images according to the optimal dual-camera relative position parameters, where the reference images are images that are photographed by the two cameras except the M groups of dual-camera images.

Step S502: If the reference average error is greater than or equal to the preset error threshold, execute the method for calculating a dual-camera position again.

A group of dual-camera images is re-collected after the optimal dual-camera relative position parameters are obtained, and the group of dual-camera images does not belong to the foregoing M groups of dual-camera images. An independent average error $\bar{t}_1$ of first distances of feature points in the re-collected independent dual-camera images is obtained according to the optimal relative position parameters. If $\bar{t}_1$ is greater than the preset error threshold, it indicates that the optimal relative position parameters are applicable to another image. The method for calculating a dual-camera position needs to be executed again to obtain new optimal dual-camera relative position parameters. Final optimal dual-camera position parameters may be obtained after the foregoing checking calculation steps are performed.

In this embodiment, a specific position calculation process for dual cameras is used as an example to describe a specific procedure of the method for calculating a dual-camera position. The method for calculating a dual-camera position includes first obtaining M groups of dual-camera images, where each group of dual-camera images in the M groups includes two images that are obtained by photographing a same scene by the dual cameras at the same time, screening the M groups of dual-camera images, to obtain Q groups of dual-camera images that can be used to calculate the dual-camera relative position, where Q≤M, obtaining dual-camera relative position parameters corresponding to dual-camera images according to each group of dual-camera images in the Q groups, and obtaining optimal dual-camera relative position parameters from all dual-camera relative position parameters corresponding to dual-camera images. In this way, when a photographed scene is relatively difficult to recognize, the dual-camera relative position can be calculated using a specific method procedure in this embodiment.

FIG. 6 is a schematic structural diagram of an apparatus for calculating a dual-camera relative position 61 according to a third embodiment of the present disclosure. The apparatus for calculating a dual-camera relative position 61 provided in this embodiment can execute the method procedures described in the first and the second embodiments. As shown in FIG. 6, the apparatus for calculating a dual-camera position 61 provided in this embodiment includes a collecting module 601 configured to obtain M groups of dual-camera images, where each group of dual-camera images in the M groups includes two images that are obtained by photographing a same scene by dual cameras at the same time, and M is a positive integer, a screening module 602 configured to screen the M groups of dual-camera images to obtain Q groups of dual-camera images that can be used to calculate the dual-camera relative position, where Q is a positive integer, and Q≤M, a position calculation module 603 configured to obtain dual-camera relative position parameters corresponding to each group of dual-camera images in the Q groups according to each group of dual-camera images in the Q groups, and an optimization module 604 configured to obtain optimal dual-camera relative position parameters from Q groups of dual-camera relative position parameters.

Further, the relative position parameters include a relative translation distance t between the two cameras and a relative rotation matrix R between the two cameras, where $t=(t_x, t_y, t_z)^T$, and x, y, and z are respectively three orthogonal coordinate axes of a plane rectangular coordinate system.

The screening module 602 may be further configured to obtain a homography matrix corresponding to a first group of dual-camera images, where each group of dual-camera images in the M groups of dual-camera images is the first group of dual-camera images, determine a projection error between two images in the first group of dual-camera images according to the homography matrix, and determine that the first group of dual-camera images are dual-camera images that can be used to calculate the dual-camera relative position when the projection error is greater than or equal to a preset error threshold.

The screening module 602 may be further configured to determine the projection error e between the two images in the first group of dual-camera images according to $$e = \sqrt{\frac{\sum_{j=1}^{N'} \|HY_i - Y'_i\|_2^2}{N'}},$$

where H represents the homography matrix corresponding to the first group of dual-camera images, $Y_j$ represents a feature point $(x_j, y_j)$ of a first image in the first group of dual-camera images, $Y'_j$ represents a feature point $(x'_j, y'_j)$ of a second image in the first group of dual-camera images, the first image is an image that is photographed by a first camera in the two cameras, and the second image is an image that is photographed by a second camera in the two cameras, j is a positive integer, j≤N', and N' represents a quantity of feature point pairs $(Y_j, Y'_j)$ in the first group of dual-camera images.

The position calculation module 603 may be further configured to obtain the relative translation distance t between the two cameras and the relative rotation matrix R between the two cameras according to a feature point pair $(X_i, X'_i)$ in a second group of dual-camera images, where each group of dual-camera images in the Q groups of dual-camera images is the second group of dual-camera images, $X_i$ represents a feature point $(x_i, y_i)$ of a first image in the second group of dual-camera images, $X'_i$ represents a feature point $(x'_i, y'_i)$ of a second image in the second group of dual-camera images, i is a positive integer, i≤N, N represents a quantity of feature point pairs $(X_i, X'_i)$ in the second group of dual-camera images.

The position calculation module 603 may be further configured to obtain t and R according to a non-linear optimization formula $$(t, R) = \underset{(t,R)}{\arg\min} \sum_{i=1}^{N} \frac{\|X'^T_i l'_i\|_2^2}{l'^2_{ia} + l'^2_{ib}} + \frac{\|X^T_i l_i\|_2^2}{l^2_{ia} + l^2_{ib}},$$

where $l'_i = K'^{-T}[t]_x R K^{-1} X_i$ is an epipolar line that is in the second image and corresponding to $X_i$, $l_i = -K^{-T}R^{-1}[t]_x K'^{-1}X'_i$ is an epipolar line that is in the first image and corresponding to $X'_i$, and $l_{ia}$ and $l_{ib}$ are respectively a first component and a second component of the vector $l_i$, $l'_i$ and $l'_{ib}$ are respectively a first component and a second component of the vector $l'_i$, K is an intrinsic parameter matrix of the first camera, K' is an intrinsic parameter matrix of the second camera, $[t]_x$ is an antisymmetric matrix $$\begin{bmatrix} 0 & -t_z & t_y \\ t_z & 0 & -t_x \\ -t_y & t_x & 0 \end{bmatrix}$$

defined by t, and N represents the quantity of feature point pairs $(X_i, X'_i)$ in the dual-camera images.

The position calculation module 603 is further configured to remove an incorrect feature point pair $(X_i, X'_i)$ in the second group of dual-camera images according to an RANSAC algorithm before obtaining t and R according to the non-linear optimization formula $$(t, R) = \underset{(t,R)}{\operatorname{argmin}} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2}.$$

After obtaining the relative translation distance t between the two cameras and the relative rotation matrix R between the two cameras according to the feature point pair $(X_i, X'_i)$ in the second group of dual-camera images, the position calculation module 603 is further configured to obtain a first distance of each feature point in the second group of dual-camera images according to the relative translation distance t and the relative rotation matrix R, where the first distance is a distance from each feature point to an epipolar line corresponding to the feature point, the epipolar line that is in the second image and corresponding to the feature point $X_i$ is $l'_i = K'^{-T}[t]_x R K^{-1} X_i$ when each feature point is the feature point in the feature point pair $(X_i, X'_i)$, and the epipolar line that is in the first image and corresponding to the feature point is $X'_i$ is $l_i = -K^{-T} R^{-1}[t]_x K'^{-1} X'_i$ when each feature point is the feature point $X'_i$ in the feature point pair $(X_i, X'_i)$, obtain a second distance according to the first distance of each feature point, where the second distance is an average value of first distances of all feature points, re-obtain the relative translation distance t and the relative rotation matrix R according to a feature point, where a difference between a first distance of the feature point and the second distance is less than or equal to a specified variance threshold, and repeat the foregoing process until a difference between the first distance of each feature point in the second group of dual-camera images and an average value of the second distance is less than the specified variance threshold.

The optimization module 604 is further configured to obtain an average error t of distances from all the feature points in the second group of dual-camera images to epipolar lines, where the first distance is a distance from each feature point to the epipolar line corresponding to the feature point, each group of dual-camera images in the Q groups of dual-camera images is the second group of dual-camera images, and the first distance is the distance from each feature point to the epipolar line corresponding to the feature point, the epipolar line that is in the second image and corresponding to the feature point is $X_i$ is $l'_i = K'^{-T}[t]_x R K^{-1} X_i$ when each feature point is the feature point $X_i$ in the feature point pair $(X_i, X'_i)$, the epipolar line that is in the first image and corresponding to the feature point $X'_i$ is $l_i = -K^{-T} R^{-1}[t]_x K'^{-1} X'_i$ when each feature point is the feature point $X'_i$ in the feature point pair $(X_i, X'_i)$, and i is a positive integer, i≤N, N represents the quantity of feature point pairs $(X_i, X'_i)$ in the second group of dual-camera images, and use dual-camera relative position parameters corresponding to dual-camera images with a minimum average error t̄ as the optimal dual-camera relative position parameters.

Further, the optimization module 604 is configured to obtain the average error t̄ of the first distances of the feature points in the second group of dual-camera images according to $$\bar{t} = \sqrt{\frac{\sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2}}{N}},$$

where $X_i$ represents the feature point $(x_i, y_i)$ of the first image in the second group of dual-camera images, and $X'_i$ represents the feature point $(x'_i, y'_i)$ of the second image in the second group of dual-camera images, $l'_i = K'^{-T}[t]_x R K^{-1} X_i$ is the epipolar line that is in the second image and corresponding to $X_i$, $l_i = -K^{-T} R^{-1}[t]_x K'^{-1} X'_i$ is the epipolar line that is in the first image and corresponding to $X'_i$, $l_{ia}$ and $l_{ib}$ are respectively the first component and the second component of the vector $l_i$, $l'_{ia}$ and $l'_{ib}$ are respectively the first component and the second component of the vector $l'_i$, K is the intrinsic parameter matrix of the first camera, K' is the intrinsic parameter matrix of the second camera, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and i is a positive integer, i≤N, and N represents the quantity of feature point pairs $(X_i, X'_i)$ in the second group of dual-camera images.

The collecting module 601 is further configured to re-obtain M groups of dual-camera images when a quantity of dual-camera images that can be used for a position calculation is less than or equal to a specified threshold.

After obtaining the optimal relative position parameters, the optimization module 604 is further configured to obtain a reference average error t̄₁ of first distances of all feature points in reference images according to the optimal dual-camera relative position parameters, where the reference images are images that are photographed by the two cameras except the obtained M groups of dual-camera images, and execute a method for calculating a dual-camera position again if the reference average error t̄₁ is greater than or equal to the preset error threshold.

In this embodiment, the collecting module 601 in the apparatus for calculating a dual-camera relative position 61 is configured to obtain M groups of dual-camera images, where each group of dual-camera images in the M groups includes two images that are obtained by photographing a same scene by dual cameras at the same time, the screening module 602 is configured to screen the M groups of dual-camera images to obtain Q groups of dual-camera images that can be used to calculate the dual-camera relative position. The position calculation module 603 is configured to obtain dual-camera relative position parameters corresponding to each group of dual-camera images in the Q groups according to each group of dual-camera images that can be used for a position calculation in the Q groups, and the optimization module 604 is configured to obtain optimal dual-camera relative position parameters from all dual-camera relative position parameters. In this way, when a photographed scene is relatively difficult to recognize, the dual-camera relative position can be calculated using the apparatus for calculating a dual-camera relative position 61.

Figure 7:
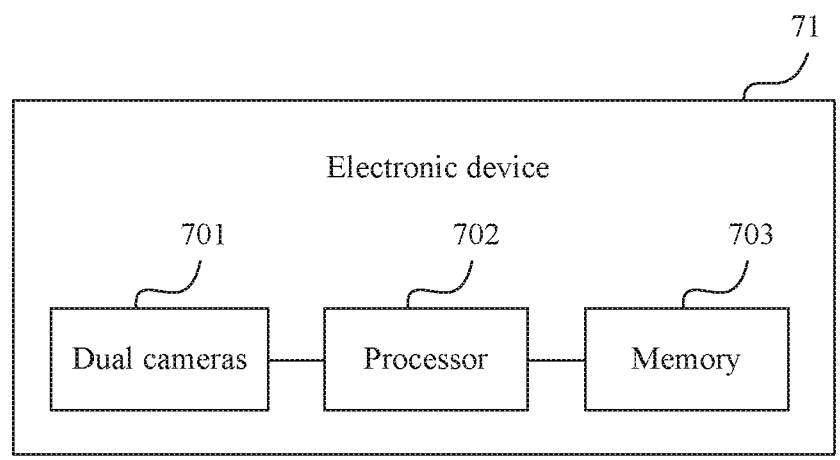
FIG. 7 is schematic structural diagram of an electronic device according to a fourth embodiment of the present disclosure.

FIG. 7 is schematic structural diagram of an electronic device 71 according to a fourth embodiment of the present disclosure. The electronic device 71 provided in this embodiment can execute the method procedures described in the first and the second embodiments. As shown in FIG. 7, the electronic device 71 provided in this embodiment includes dual cameras 701 configured to use two cameras to respectively photograph two images of a same scene at the same time, one or more processors 702, a memory 703, and one or more programs, where the one or more programs are stored in the memory 703 and configured to be executed by the one or more processors 702, and the one or more programs include an instruction used to execute the method for calculating a dual-camera relative position according to the foregoing embodiments.

Further, the instruction of the method for calculating a dual-camera relative position includes obtaining M groups of dual-camera images, where each group of dual-camera images in the M groups includes two images that are obtained by photographing a same scene by dual cameras at the same time, and M is a positive integer, screening the M groups of dual-camera images, to obtain Q groups of dual-camera images that can be used to calculate the dual-camera relative position, where Q is a positive integer, and Q≤M, obtaining dual-camera relative position parameters corresponding to each group of dual-camera images in the Q groups according to each group of dual-camera images in the Q groups, and obtaining optimal dual-camera relative position parameters from Q groups of dual-camera relative position parameters.

Further, the relative position parameters include a relative translation distance t between the two cameras and a relative rotation matrix R between the two cameras, where $t=(t_x, t_y, t_z)^T$, and x, y, and z are respectively three orthogonal coordinate axes of a plane rectangular coordinate system.

Screening each group of dual-camera images to obtain multiple groups of dual-camera images that can be used to calculate the relative position further includes obtaining a homography matrix corresponding to a first group of dual-camera images, where each group of dual-camera images in the M groups of dual-camera images is the first group of dual-camera images, determining a projection error between two images in the first group of dual-camera images according to the homography matrix, and determining that the first group of dual-camera images are dual-camera images that can be used to calculate the dual-camera relative position when the projection error is greater than or equal to a preset error threshold.

Determining the projection error between the two images in each group of dual-camera images according to the homography matrix further includes determining the projection error e between the two images in the first group of dual-camera images according to $$e = \sqrt{\frac{\sum_{j=1}^{N'} \|HY_j - Y'_j\|_2^2}{N'}},$$

where H represents the homography matrix corresponding to the first group of dual-camera images, $Y_j$ represents a feature point $(x_j, y_j)$ of a first image in the first group of dual-camera images, $Y'_j$ represents a feature point $(x'_j, y'_j)$ of a second image in the first group of dual-camera images, j is a positive integer, j≤N', N' represents a quantity of feature point pairs $(Y_j, Y'_j)$ in the first group of dual-camera images, the first image is an image that is photographed by a first camera in the two cameras, and the second image is an image that is photographed by a second camera in the two cameras.

Obtaining the dual-camera relative position parameters corresponding to each group of dual-camera images in the Q groups according to each group of dual-camera images in the Q groups further includes obtaining the relative translation distance t between the two cameras and the relative rotation matrix R between the two cameras according to a feature point pair $(X_i, X'_i)$ in a second group of dual-camera images, where each group of dual-camera images in the Q groups of dual-camera images is the second group of dual-camera images, $X_i$ represents a feature point $(x_i, y_i)$ of a first image in the second group of dual-camera images, $X'_i$ represents a feature point $(x'_i, y'_i)$ of a second image in the second group of dual-camera images, i is a positive integer, i≤N, N represents a quantity of feature point pairs $(X_i, X'_i)$ in the second group of dual-camera images, the first image is an image that is photographed by the first camera in the two cameras, and the second image is an image that is photographed by the second camera in the two cameras.

Obtaining the relative translation distance t between the two cameras and the relative rotation matrix R between the two cameras according to a feature point pair $(X_i, X'_i)$ in each group of dual-camera images in the Q groups further includes obtaining t and R according to a non-linear optimization formula $$(t, R) = \underset{(t,R)}{\mathrm{argmin}} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2},$$

where $l'_i = K'^{-T}[t]_x R K^{-1} X_i$ is an epipolar line that is in the second image and corresponding to $X_i$, $l_i = -K^{-T} R^{-1}[t]_x K'^{-1} X'_i$ is an epipolar line that is in the first image and corresponding to $X'_i$, and $l_{ia}$ and $l_{ib}$ are respectively a first component and a second component of the vector $l_i$, $l'_{ia}$ and $l'_{ib}$ are respectively a first component and a second component of the vector $l'_i$, K is an intrinsic parameter matrix of the first camera, K' is an intrinsic parameter matrix of the second camera, and $[t]_x$ is an antisymmetric matrix $$\begin{bmatrix} 0 & -t_z & t_y \\ t_z & 0 & -t_x \\ -t_y & t_x & 0 \end{bmatrix}$$

defined by t.

Further, before t and R are obtained according to the non-linear optimization formula $$(t, R) = \underset{(t,R)}{\mathrm{argmin}} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2},$$

the instruction may further include removing an incorrect feature point pair $(X_i, X'_i)$ in the second group of dual-camera images according to an RANSAC algorithm.

After the relative translation distance t between the two cameras and the relative rotation matrix R between the two cameras are obtained according to a feature point pair $(X_i, X'_i)$ in a second group of dual-camera images, the instruction further includes obtaining a first distance of each feature point in the second group of dual-camera images according to the relative translation distance t and the relative rotation matrix R, where the first distance is a distance from each feature point to an epipolar line corresponding to the feature point, the epipolar line that is in the second image and corresponding to the feature point $X_i$ is $l'_i = K'^{-T}[t]_x R K^{-1} X_i$ when each feature point is the feature point $X_i$ in the feature point pair $(X_i, X'_i)$, and the epipolar line that is in the first image and corresponding to the feature point $X'_i$ is $l_i = -K^{-T} R^{-1}[t]_x K'^{-1} X'_i$ when each feature point is the feature point $X'_i$ in the feature point pair $(X_i, X'_i)$, obtaining a second distance according to the first distance of each feature point, where the second distance is an average value of first distances of all feature points, re-obtaining the relative translation distance t and the relative rotation matrix R according to a feature point, where a difference between a first distance of the feature point and the second distance is less than or equal to a specified variance threshold, and repeating the foregoing process until a difference between the first distance of each feature point in the second group of dual-camera images and an average value of the second distance is less than the specified variance threshold.

Obtaining the optimal dual-camera relative position parameters further includes obtaining an average error $\bar{t}$ of the first distances of all the feature points in the second group of dual-camera images, where each group of dual-camera images in the Q groups of dual-camera images is the second group of dual-camera images, and the first distance is the distance from each feature point to the epipolar line corresponding to the feature point, the epipolar line that is in the second image and corresponding to the feature point $X_i$ is $l'_i = K'^{-T}[t]_x R K^{-1} X_i$ when each feature point is the feature point $X_i$ in the feature point pair $(X_i, X'_i)$, the epipolar line that is in the first image and corresponding to the feature point $X'_i$ is $l_i = -K^{-T} R^{-1} [t]_x K'^{-1} X'_i$ when each feature point is the feature point $X'_i$ in the feature point pair $(X_i, X'_i)$, and i is a positive integer, i≤N, $X_i$ represents the feature point $(x_i, y_i)$ of the first image in the second group of dual-camera images, $X'_i$ represents the feature point $(x'_i, y'_i)$ of the second image in the second group of dual-camera images, and N represents the quantity of feature point pairs $(X_i, X'_i)$ in the second group of dual-camera images, and setting relative position parameters corresponding to dual-camera images with a minimum average error $\bar{t}$ as the optimal dual-camera relative position parameters.

Obtaining the average error $\bar{t}$ of the first distances of all the feature points in each dual-camera image further includes obtaining the average error $\bar{t}$ of the first distances of the feature points in the second group of dual-camera images according to $$\bar{t} = \sqrt{\frac{\sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}}}{N}},$$

where $x_i$ represents the feature point $(x_i, y_i)$ of the first image in the second group of dual-camera images, and $X'_i$ represents the feature point $(x'_i, y'_i)$ of the second image in the second group of dual-camera images, $l'_i = K'^{-T}[t]_x R K^{-1} X_i$ is the epipolar line that is in the second image and corresponding to $X_i$, $l_i = -K^{-T} R^{-1} [t]_x K'^{-1} X'_i$ is the epipolar line that is in the first image and corresponding to $X'_i$, $l_{ia}$ and $l_{ib}$ are respectively the first component and the second component of the vector $l_i$, $l'_{ia}$ and $l'_{ib}$ are respectively the first component and the second component of the vector $l'_i$, K is the intrinsic parameter matrix of the first camera, K' is the intrinsic parameter matrix of the second camera, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and i is a positive integer, i≤N, and N represents the quantity of feature point pairs $(X_i, X'_i)$ in the second group of dual-camera images.

Further, M groups of dual-camera images should be re-obtained when a quantity of dual-camera images that can be used for a position calculation is less than or equal to a specified threshold.

After the optimal dual-camera relative position parameters are obtained, the instruction further includes obtaining a reference average error $\bar{t}_1$ of first distances of all feature points in reference images according to the optimal dual-camera relative position parameters, where the first distance is a distance from each feature point to an epipolar line corresponding to the feature point, the epipolar line that is in the second image and corresponding to the feature point $X_i$ is $l'_i = K'^{-T}[t]_x R K^{-1} X_i$, the epipolar line that is in the first image and corresponding to the feature point $X'_i$ is $l_i = -K^{-T} R^{-1} [t]_x K'^{-1} X'_i$, i is a positive integer, i≤N, N represents the quantity of feature point pairs $(X_i, X'_i)$ in the second group of dual-camera images, and the reference images are images that are photographed by the two cameras except the obtained M groups of dual-camera images, and executing the method for calculating a dual-camera position again if the reference average error $\bar{t}_1$ is greater than or equal to the preset error threshold.

In this embodiment, the electronic device 71 includes the dual cameras 701, where the dual cameras are configured to use the two cameras to respectively photograph two images of a same scene at the same time, the one or more processors 702, the memory 703, and the one or more programs, where the one or more programs are stored in the memory 703 and configured to be executed by the one or more processors 702, and the one or more programs include the instruction used to execute the method for calculating a dual-camera relative position according to the foregoing embodiments. In this way, when a photographed scene is relatively difficult to recognize, a dual-camera relative position can be calculated using the electronic device 71.

In another aspect, the present disclosure further provides a computer-readable storage medium in which one or more programs are stored. The one or more programs include an instruction, and when an electronic device that includes dual cameras and multiple application programs executes the instruction, the electronic device is enabled to execute a method for calculating a dual-camera relative position according to the foregoing embodiments. The dual cameras are configured to use two cameras to photograph a same scene.

The method for calculating a dual-camera relative position that is executed by the electronic device when the electronic device executes the instruction includes obtaining M groups of dual-camera images, where each group of dual-camera images in the M groups includes two images that are obtained by photographing the same scene by the dual cameras at the same time, and M is a positive integer, screening the M groups of dual-camera images, to obtain Q groups of dual-camera images that can be used to calculate the dual-camera relative position, where Q is a positive integer, and Q≤M, obtaining dual-camera relative position parameters corresponding to each group of dual-camera images in the Q groups according to each group of dual-camera images in the Q groups, and obtaining optimal dual-camera relative position parameters from Q groups of dual-camera relative position parameters.

Further, the relative position parameters include a relative translation distance t between the two cameras and a relative rotation matrix R between the two cameras, where $t=(t_x, t_y,$ $t_z)^T$, and x, y, and z are respectively three orthogonal coordinate axes of a plane rectangular coordinate system.

Screening each group of dual-camera images to obtain multiple groups of dual-camera images that can be used to calculate the relative position further includes obtaining a homography matrix corresponding to a first group of dual-camera images, where each group of dual-camera images in the M groups of dual-camera images is the first group of dual-camera images, determining a projection error between two images in the first group of dual-camera images according to the homography matrix, and determining that the first group of dual-camera images are dual-camera images that can be used to calculate the dual-camera relative position when the projection error is greater than or equal to a preset error threshold.

Determining a projection error between two images in each group of dual-camera images according to the homography matrix further includes determining the projection error e between the two images in the first group of dual-camera images according to $$e = \sqrt{\frac{\sum_{j=1}^{N'} \|HY_i - Y_i'\|_2^2}{N'}},$$

where H represents the homography matrix corresponding to the first group of dual-camera images, $Y_i$ represents a feature point $(x_i, y_i)$ of a first image in the first group of dual-camera images, $Y'_i$ represents a feature point $(x'_i, y'_i)$ of a second image in the first group of dual-camera images, is a positive integer, $j \leq N'$, $N'$ represents a quantity of feature point pairs $(Y_i, Y'_i)$ in the first group of dual-camera images, the first image is an image that is photographed by a first camera in the two cameras, and the second image is an image that is photographed by a second camera in the two cameras.

Obtaining dual-camera relative position parameters corresponding to each group of dual-camera images in the Q groups according to each group of dual-camera images in the Q groups further includes obtaining the relative translation distance t between the two cameras and the relative rotation matrix R between the two cameras according to a feature point pair $(X_i, X'_i)$ in a second group of dual-camera images, where each group of dual-camera images in the Q groups of dual-camera images is the second group of dual-camera images, $X_i$ represents a feature point $(x_i, y_i)$ of a first image in the second group of dual-camera images, $X'_i$ represents a feature point $(x'_i, y'_i)$ of a second image in the second group of dual-camera images, i is a positive integer, $i \leq N$, N represents a quantity of feature point pairs $(X_i, X'_i)$ in the second group of dual-camera images, the first image is an image that is photographed by the first camera in the two cameras, and the second image is an image that is photographed by the second camera in the two cameras.

Obtaining the relative translation distance t between the two cameras and the relative rotation matrix R between the two cameras according to a feature point pair $(X_i, X'_i)$ in each group of dual-camera images in the Q groups further includes obtaining t and R according to a non-linear optimization formula $$(t, R) = \underset{(t,R)}{\operatorname{argmin}} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2},$$

where $l'_i = K'^{-T}[t]_x R K^{-1} X_i$ is an epipolar line that is in the second image and corresponding to $X_i$, $l_i = -K^{-T} R^{-1}[t]_x K'^{-1} X'_i$ is an epipolar line that is in the first image and corresponding to $X'_i$, $l_{ia}$ and $l_{ib}$ are respectively a first component and a second component of the vector $l_i$, $l'_{ia}$ and $l'_{ib}$ are respectively a first component and a second component of the vector $l'_i$, K is an intrinsic parameter matrix of the first camera, K' is an intrinsic parameter matrix of the second camera, and $[t]_x$ is an antisymmetric matrix $$\begin{bmatrix} 0 & -t_z & t_y \\ t_z & 0 & -t_x \\ -t_y & t_x & 0 \end{bmatrix}$$

defined by t.

Further, before obtaining t and R according to a non-linear optimization formula $$(t, R) = \underset{(t,R)}{\operatorname{argmin}} \sum_{i=1}^{N} \frac{\|X_i'^T l_i'\|_2^2}{l_{ia}'^2 + l_{ib}'^2} + \frac{\|X_i^T l_i\|_2^2}{l_{ia}^2 + l_{ib}^2},$$

the method may further include removing an incorrect feature point pair $(X_i, X'_i)$ in the second group of dual-camera images according to a RANSAC algorithm.

Further, after obtaining the relative translation distance t between the two cameras and the relative rotation matrix R between the two cameras according to a feature point pair $(X_i, X'_i)$ in a second group of dual-camera images, the method further includes obtaining a first distance of each feature point in the second group of dual-camera images according to the relative translation distance t and the relative rotation matrix R, where the first distance is a distance from each feature point to an epipolar line corresponding to the feature point, the epipolar line that is in the second image and corresponding to the feature point $X_i$ is $l'_i = K'^{-T}[t]_x R K^{-1} X_i$ when each feature point is the feature point $X_i$ in the feature point pair $(X_i, X'_i)$, and the epipolar line that is in the first image and corresponding to the feature point $X'_i$ is $l_i = -K^{-T} R^{-1}[t]_x K'^{-1} X'_i$ when each feature point is the feature point $X'_i$ in the feature point pair $(X_i, X'_i)$, obtaining a second distance according to the first distance of each feature point, where the second distance is an average value of first distances of all feature points, re-obtaining the relative translation distance t and the relative rotation matrix R according to a feature point, where a difference between a first distance of the feature point and the second distance is less than or equal to a specified variance threshold, and repeating the foregoing process until a difference between the first distance of each feature point in the second group of dual-camera images and an average value of the second distance is less than the specified variance threshold.

Obtaining optimal dual-camera relative position parameters further includes obtaining an average error $\bar{t}$ of the first distances of all the feature points in the second group of dual-camera images, where each group of dual-camera images in the Q groups of dual-camera images is the second group of dual-camera images, and the first distance is the distance from each feature point to the epipolar line corresponding to the feature point, the epipolar line that is in the second image and corresponding to the feature point $X_i$ is $l'_i = K'^{-T}[t]_x R K^{-1} X_i$ when each feature point is the feature point $X_i$ in the feature point pair $(X_i, X'_i)$, the epipolar line that is in the first image and corresponding to the feature point $X'_i$ is $l_i = -K^{-T} R^{-1}[t]_x K'^{-1} X'_i$ when each feature point is the feature point $X'_i$ in the feature point pair $(X_i, X'_i)$, and i is a positive integer, i≤N, $X_i$ represents the feature point $(x_i, y_i)$ of the first image in the second group of dual-camera images, $X'_i$ represents the feature point $(x'_i, y'_i)$ of the second image in the second group of dual-camera images, and N represents the quantity of feature point pairs $(X_i, X'_i)$ in the second group of dual-camera images, and setting relative position parameters corresponding to dual-camera images with a minimum average error $\bar{t}$ as the optimal dual-camera relative position parameters.

Further, the obtaining an average error $\bar{t}$ of the first distances of all the feature points in each dual-camera image further includes obtaining the average error $\bar{t}$ of the first distances of the feature points in the second group of dual-camera images according to $$\bar{t} = \sqrt{\frac{\sum_{i=1}^{N} \frac{\|X_i'^T l_i\|_2^2}{l_{ia}'^2 + l_{ib}'^2} + \frac{\|X_i^T l_i\|_2^2}{l_{ia}^2 + l_{ib}^2}}{N}},$$

where $X_i$ represents the feature point $(x_i, y_i)$ of the first image in the second group of dual-camera images, and $X'_i$ represents the feature point $(x'_i, y'_i)$ of the second image in the second group of dual-camera images, $l'_i = K'^{-T}[t]_x R K^{-1} X_i$ is the epipolar line that is in the second image and corresponding to $X_i$, $l_i = -K^{-T} R^{-1} [t]_x K'^{-1} X'_i$ is the epipolar line that is in the first image and corresponding to $X'_i$, $l_{ia}$ and $l_{ib}$ are respectively the first component and the second component of the vector $l_i$, $l'_{ia}$ and $l'_{ib}$ are respectively the first component and the second component of the vector $l'_i$, K is the intrinsic parameter matrix of the first camera, K' is the intrinsic parameter matrix of the second camera, and $[t]_x$ is the antisymmetric matrix $$\begin{bmatrix} 0 & -t_z & t_y \\ t_z & 0 & -t_x \\ -t_y & t_x & 0 \end{bmatrix}$$

defined by t, and i is a positive integer, i≤N, and N represents the quantity of feature point pairs $(x'_i, y'_i)$ in the second group of dual-camera images.

Further, M groups of dual-camera images should be re-obtained when a quantity of dual-camera images that can be used for a position calculation is less than or equal to a specified threshold.

Further, after obtaining optimal dual-camera relative position parameters, the instruction further includes obtaining a reference average error $\bar{t}_1$ of first distances of all feature points in reference images according to the optimal dual-camera relative position parameters, where the first distance is a distance from each feature point to an epipolar line corresponding to the feature point, the epipolar line that is in the second image and corresponding to the feature point $X_i$ is $l'_i = K'^{-T}[t]_x R K^{-1} X_i$, the epipolar line that is in the first image and corresponding to the feature point $X'_i$ is $l_i = -K^{-T} R^{-1} [t]_x K'^{-1} X'_i$ is a positive integer, i≤N, N represents the quantity of feature point pairs $(x'_i, y'_i)$ in the second group of dual-camera images, and the reference images are images that are photographed by the two cameras except the obtained M groups of dual-camera images, and if the reference average error $\bar{t}_1$ is greater than or equal to the preset error threshold, executing the method for calculating a dual-camera position again.

In this embodiment, the computer-readable storage medium in which one or more programs are stored is provided. The one or more programs include an instruction, and when an electronic device that includes dual cameras and multiple application programs executes the instruction, the electronic device is enabled to execute a method for calculating a dual-camera relative position according to the foregoing embodiments. The dual cameras are configured to use two cameras to photograph a same scene. In this way, when a photographed scene is relatively difficult to recognize, a dual-camera relative position can be calculated using the apparatus for calculating a dual-camera relative position.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for calculating a dual-camera relative position, comprising:
    obtaining M groups of dual-camera images, wherein each group of dual-camera images in the M groups comprises two images obtained by photographing a same scene by two cameras at the same time, wherein M is a positive integer, and wherein the M groups of dual-camera images are re-obtained when a quantity of dual-camera images that can be used for a position calculation is less than or equal to a specified threshold;
    screening the M groups of dual-camera images to obtain Q groups of dual-camera images that can be used to calculate the dual-camera relative position, wherein Q is a positive integer, and wherein Q≤M;
    obtaining dual-camera relative position parameters corresponding to each group of dual-camera images in the Q groups according to each group of dual-camera images in the Q groups;
    obtaining optimal dual-camera relative position parameters from Q groups of dual-camera relative position parameters; and
    calculating the dual-camera relative position using the optimal dual-camera relative position parameters.

2. The method for calculating the dual-camera relative position of claim 1, wherein the dual-camera relative position parameters comprise a relative translation distance (t) between the two cameras and a relative rotation matrix (R) between the two cameras, wherein $t=(t_x,t_y,t_z)^T$, and wherein x, y, and z are respectively three orthogonal coordinate axes of a plane rectangular coordinate system.

3. The method for calculating the dual-camera relative position of claim 1, wherein screening the M groups of dual-camera images to obtain the Q groups of dual-camera images comprises:
   obtaining a homography matrix corresponding to a first group of dual-camera images, wherein each group of dual-camera images in the M groups of dual-camera images is the first group of dual-camera images;
   calculating a projection error (e) between two images in the first group of dual-camera images according to the homography matrix; and
   identifying that the first group of dual-camera images are dual-camera images that can be used to calculate the dual-camera relative position when the e is greater than or equal to a preset error threshold.

4. The method for calculating the dual-camera relative position of claim 3, wherein calculating the e comprises calculating the e according to $$e = \sqrt{\frac{\sum_{j=1}^{N} \|HY_i - Y'_i\|_2^2}{N'}},$$

wherein H represents the homography matrix corresponding to the first group of dual-camera images, wherein $Y_i$ represents a feature point $(x_i, y_i)$ of a first image in the first group of dual-camera images, wherein $Y_i$ represents a feature point $(x'_i, y'_i)$ of a second image in the first group of dual-camera images, wherein j is a positive integer, wherein j≤N',
   wherein N' represents a quantity of feature point pairs $(Y_i, Y'_i)$ in the first group of dual-camera images, wherein the first image is photographed by a first camera in the two cameras, and wherein the second image is photographed by a second camera in the two cameras.

5. The method for calculating the dual-camera relative position of claim 1, wherein obtaining the dual-camera relative position parameters comprises obtaining a relative translation distance (t) between the two cameras and a relative rotation matrix (R) between the two cameras according to a feature point pair $(X_i, X'_i)$ in a second group of dual-camera images, wherein each group of dual-camera images in the Q groups of dual-camera images is the second group of dual-camera images, wherein $X_i$ represents a feature point $(x_i, y_i)$ of a first image in the second group of dual-camera images, wherein $X'_i$ represents a feature point $(x'_i, y'_i)$ of a second image in the second group of dual-camera images, wherein i is a positive integer, wherein i≤N, wherein N represents a quantity of feature point pairs $(X_i, X'_i)$ in the second group of dual-camera images, wherein the first image is photographed by a first camera in the two cameras, and wherein the second image is photographed by a second camera in the two cameras.

6. The method for calculating the dual-camera relative position of claim 5, wherein obtaining the t and the R comprises obtaining the t and the R according to a non-linear optimization formula $$(t, R) = \underset{(t,R)}{\mathrm{argmin}} \sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}},$$

wherein vector $l'_i = K'^{-T}[t]_x R K^{-1} X_i$ is an epipolar line in the second image corresponding to the $X_i$, wherein vector $l_i = -K^{-T}R^{-1}[t]_x K'^{-1} X'_i$ is an epipolar line in the first image corresponding to the $X'_i$, wherein $l_{ia}$ and $l_{ib}$ are respectively a first component and a second component of the vector $l_i$, wherein $l'_{ia}$ and $l'_{ib}$ are respectively a first component and a second component of the vector $l'_i$, wherein K is an intrinsic parameter matrix of the first camera, wherein K' is an intrinsic parameter matrix of the second camera, and wherein $[t]_x$ is an antisymmetric matrix $$\begin{bmatrix} 0 & -t_z & t_y \\ t_z & 0 & -t_x \\ -t_y & t_x & 0 \end{bmatrix}$$

defined by the t.

7. The method for calculating the dual-camera relative position of claim 6, wherein before obtaining the t and the R, the method further comprises removing an incorrect feature point pair $(X_i, X'_i)$ in the second group of dual-camera images according to a random sample consensus (RANSAC) algorithm.

8. The method for calculating the dual-camera relative position of claim 5, wherein after obtaining the t and the R, the method further comprises:
   obtaining a first distance of each feature point in the second group of dual-camera images according to the t and the R, wherein the first distance is a distance from each feature point to an epipolar line corresponding to the feature point, wherein an epipolar line in the second image corresponding to the feature point $X_i$ is $l'_i = K'^{-T}[t]_x R K^{-1} X_i$ when each feature point is the feature point $X_i$ in the feature point pair $(X_i, X'_i)$, wherein an epipolar line in the first image corresponding to the feature point $X'_i$ is $l_i = -K^{-T}R^{-1}[t]_x K'^{-1} X'_i$ when each feature point is the feature point $X'_i$ in the feature point pair $(X_i, X'_i)$ wherein $[t]_x$ is an antisymmetric matrix $$\begin{bmatrix} 0 & -t_z & t_y \\ t_z & 0 & -t_x \\ -t_y & t_x & 0 \end{bmatrix}$$

defined by the t, wherein K is an intrinsic parameter matrix of the first camera, and wherein K' is an intrinsic parameter matrix of the second camera;
   obtaining a second distance according to the first distance of each feature point, wherein the second distance is an average value of first distances of all feature points;
   re-obtaining the t and the R according to a feature point, wherein a difference between the first distance of the feature point and the second distance is less than or equal to a specified variance threshold; and
   repeating the foregoing process until a difference between the first distance of each feature point in the second group of dual-camera images and an average value of the second distance is less than the specified variance threshold.

9. The method for calculating the dual-camera relative position of claim 1, wherein obtaining the optimal dual-camera relative position parameters comprises:
   obtaining an average error ($\bar{t}$) of first distances of all feature points in a second group of dual-camera images, wherein each group of dual-camera images in the Q groups of dual-camera images is the second group of dual-camera images, wherein a first distance is a distance from each feature point to an epipolar line corresponding to the feature point, wherein an epipolar line in a second image corresponding to a feature point $X_i$ is $l'_i=K'^{-T}[t]_x RK^{-1}X_i$ when each feature point is the feature point $X_i$ in a feature point pair $(X_i,X'_i)$, wherein R is a relative rotation matrix between the two cameras, wherein an epipolar line in a first image corresponding to a feature point $X'_i$ is $l_i=-K^{-T}R^{-1}[t]_x K'^{-1}X'_i$ when each feature point is the feature point $X'_i$ in the feature point pair $(X_i,X'_i)$, wherein i is a positive integer, wherein i≤N, wherein $X_i$ represents a feature point $(x_i,y_i)$ of the first image in the second group of dual-camera images, wherein $X'_i$ represents a feature point $(x'_i,y'_i)$ of the second image in the second group of dual-camera images, wherein N represents a quantity of feature point pairs $(X_i,X'_i)$ in the second group of dual-camera images, wherein $[t]_x$ is an antisymmetric matrix $$\begin{bmatrix} 0 & -t_z & t_y \\ t_z & 0 & -t_x \\ -t_y & t_x & 0 \end{bmatrix}$$

defined by a relative translation distance (t), wherein the first image is photographed by a first camera in the two cameras, wherein the second image is photographed by a second camera in the two cameras, wherein K is an intrinsic parameter matrix of the first camera, and wherein K' is an intrinsic parameter matrix of the second camera; and setting relative position parameters corresponding to dual-camera images with a minimum $\bar{t}$ as the optimal dual-camera relative position parameters.

10. The method for calculating the dual-camera relative position of claim 9, wherein obtaining the $\bar{t}$ comprises obtaining the $\bar{t}$ of the first distances of all the feature points in the second group of dual-camera images according to $$\bar{t}=\sqrt{\frac{\sum_{i=1}^{N}\frac{\|X_i'^T l'_i\|_2^2}{l'^2_{ia}+l'^2_{ib}}+\frac{\|X_i^T l_i\|_2^2}{l^2_{ia}+l^2_{ib}}}{N}},$$

wherein the $X_i$ represents the feature point $(x_i,y_i)$ of the first image in the second group of dual-camera images, wherein the $X'_i$ represents the feature point $(x'_i,y'_i)$ of the second image in the second group of dual-camera images, wherein the first image is photographed by the first camera in the two cameras, wherein the second image is photographed by the second camera in the two cameras, wherein vector $l'_i=K'^{-T}[t]_x RK^{-1}X_i$ is the epipolar line in the second image corresponding to the $X_i$, wherein vector $l_i=-K^{-T}R^{-1}[t]_x K'^{-1}X'_i$ is the epipolar line in the first image corresponding to the $X'_i$, wherein $l_{ia}$ and $l_{ib}$ are respectively a first component and a second component of the vector $l_i$, wherein $l'_{ia}$ and $l'_{ib}$ are respectively a first component and a second component of the vector $l'_i$, wherein K is an intrinsic parameter matrix of the first camera, wherein K' is an intrinsic parameter matrix of the second camera, wherein $[t]_x$ is the antisymmetric matrix $$\begin{bmatrix} 0 & -t_z & t_y \\ t_z & 0 & -t_x \\ -t_y & t_x & 0 \end{bmatrix}$$

defined by the t, and wherein N represents the quantity of feature point pairs $(X_i,X'_i)$ in the second group of dual-camera images.

11. The method for calculating the dual-camera relative position of claim 1, wherein after obtaining the optimal dual-camera relative position parameters, the method further comprises:

obtaining a reference average error $(\bar{t}_i)$ of first distances of all feature points in reference images according to the optimal dual-camera relative position parameters, wherein a first distance is a distance from each feature point to an epipolar line corresponding to the feature point, wherein $X_i$ represents a feature point $(x_i,y_i)$ of a first image in a second group of dual-camera images, wherein $X'_i$ represents a feature point $(x'_i,y'_i)$ of a second image in the second group of dual-camera images, wherein each group of dual-camera images in the Q groups of dual-camera images is the second group of dual-camera images, wherein an epipolar line in the second image corresponding to the feature point $X_i$ is $l'_i=K'^{-T}[t]_x RK^{-1}X_i$ when each feature point is the feature point $X_i$ in a feature point pair $(X_i,X'_i)$, wherein an epipolar line in the first image corresponding to the feature point $X'_i$ is $l_i=-K^{-T}R^{-1}[t]_x K'^{-1}X'_i$ when each feature point is the feature point $X'_i$ in the feature point pair $(X_i,X'_i)$, wherein i is a positive integer, wherein i≤N, wherein N represents a quantity of feature point pairs $(X_i,X'_i)$ in the second group of dual-camera images, wherein t is relative translation distance between the two cameras, wherein R is a relative rotation matrix between the two cameras, wherein K is an intrinsic parameter matrix of the first camera, wherein K' is an intrinsic parameter matrix of the second camera, wherein $[t]_x$ is an antisymmetric matrix $$\begin{bmatrix} 0 & -t_z & t_y \\ t_z & 0 & -t_x \\ -t_y & t_x & 0 \end{bmatrix}$$

defined by the t, wherein the first image is photographed by a first camera in the two cameras, wherein the second image is photographed by a second camera in the two cameras, and wherein the reference images are images photographed by the two cameras except the obtained M groups of dual-camera images; and executing the method for calculating the dual-camera position again when the $(\bar{t}_i)$ is greater than or equal to a preset error threshold.

12. An apparatus for calculating a dual-camera relative position, comprising:
a memory comprising instructions; and
a processor coupled to the memory, wherein the instructions cause the processor to be configured to:
obtain M groups of dual-camera images, wherein each group of dual-camera images in the M groups comprises two images obtained by photographing a same scene by two cameras at the same time, wherein M is a positive integer, and wherein the M groups of dual-camera images are re-obtained when a quantity of dual-camera images that can be used for a position calculation is less than or equal to a specified threshold;
screen the M groups of dual-camera images to obtain Q groups of dual-camera images that can be used to calculate the dual-camera relative position, wherein Q is a positive integer, and wherein Q≤M;

obtain dual-camera relative position parameters corresponding to each group of dual-camera images in the Q groups according to each group of dual-camera images in the Q groups;

obtain optimal dual-camera relative position parameters from Q groups of dual-camera relative position parameters; and calculate the dual-camera relative position using the optimal dual-camera relative position parameters.

13. The apparatus for calculating the dual-camera relative position of claim 12, wherein the dual-camera relative position parameters comprise a relative translation distance (t) between the two cameras and a relative rotation matrix (R) between the two cameras, wherein $t=(t_x,t_y,t_z)^T$, and wherein x, y, and z are respectively three orthogonal coordinate axes of a plane rectangular coordinate system.

14. The apparatus for calculating the dual-camera relative position of claim 12, wherein the instructions further cause the processor to be configured to:

obtain a homography matrix corresponding to a first group of dual-camera images, wherein each group of dual-camera images in the M groups of dual-camera images is the first group of dual-camera images;

calculate a projection error (e) between two images in the first group of dual-camera images according to the homography matrix; and identify that the first group of dual-camera images are dual-camera images that can be used to calculate the dual-camera relative position when the e is greater than or equal to a preset error threshold.

15. The apparatus for calculating the dual-camera relative position of claim 14, wherein the instructions further cause the processor to be configured to calculate the e according to $$e = \sqrt{\frac{\sum_{j=1}^{N'} \|HY_j - Y'_j\|_2^2}{N'}},$$

wherein H represents the homography matrix corresponding to the first group of dual-camera images, wherein $Y_j$ represents a feature point $(x_j,y_j)$ of a first image in the first group of dual-camera images, wherein $Y'_j$ represents a feature point $(x'_j,y'_j)$ of a second image in the first group of dual-camera images, wherein j is a positive integer, wherein j≤N', wherein N' represents a quantity of feature point pairs $(Y_j,Y'_j)$ in the first group of dual-camera images, wherein the first image is photographed by a first camera in the two cameras, and wherein the second image is photographed by a second camera in the two cameras.

16. The apparatus for calculating the dual-camera relative position of claim 12, wherein the instructions further cause the processor to be configured to obtain a relative translation distance (t) between the two cameras and a relative rotation matrix (R) between the two cameras according to a feature point pair $(X_i,X'_i)$ in a second group of dual-camera images, wherein each group of dual-camera images in the Q groups of dual-camera images is the second group of dual-camera images, wherein $X_i$ represents a feature point $(x_i,y_i)$ of a first image in the second group of dual-camera images, wherein $X'_i$ represents a feature point $(x'_i,y'_i)$ of a second image in the second group of dual-camera images, wherein i is a positive integer, wherein i≤N, wherein N represents a quantity of feature point pairs $(X_i,X'_i)$ in the second group of dual-camera images, wherein the first image is photographed by a first camera in the two cameras, and wherein the second image is photographed by a second camera in the two cameras.

17. The apparatus for calculating the dual-camera relative position of claim 16, wherein the instructions further cause the processor to be configured to obtain the t and the R according to a non-linear optimization formula $$(t, R) = \underset{(t,R)}{\operatorname{argmin}} \sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}},$$

wherein vector $l'_i = K'^{-T}[t]_x R K^{-1} X_i$ is an epipolar line in the second image corresponding to the $X_i$, wherein vector $l_i = -K^{-T} R^{-1} [t]_x K'^{-1} X'_i$ is an epipolar line in the first image corresponding to the $X'_i$, wherein $l_{ia}$ and $l_{ib}$ are respectively a first component and a second component of the vector $l_i$, wherein $l'_{ia}$ and $l'_{ib}$ are respectively a first component and a second component of the vector $l'_i$, wherein K is an intrinsic parameter matrix of the first camera, wherein K' is an intrinsic parameter matrix of the second camera, and wherein $[t]_x$ is an antisymmetric matrix $$\begin{bmatrix} 0 & -t_z & t_y \\ t_z & 0 & -t_x \\ -t_y & t_x & 0 \end{bmatrix}$$

defined by the t.

18. The apparatus for calculating the dual-camera relative position of claim 17, wherein the instructions further cause the processor to be configured to remove an incorrect feature point pair $(X_i,X'_i)$ in the second group of dual-camera images according to a random sample consensus (RANSAC) algorithm before obtaining the t and the R according to the non-linear optimization formula $$(t, R) = \underset{(t,R)}{\operatorname{argmin}} \sum_{i=1}^{N} \frac{\|X_i'^T l'_i\|_2^2}{l'^2_{ia} + l'^2_{ib}} + \frac{\|X_i^T l_i\|_2^2}{l^2_{ia} + l^2_{ib}}.$$

19. The apparatus for calculating the dual-camera relative position of claim 16, wherein after obtaining the t and the R, the instructions further cause the processor to be configured to:

obtain a first distance of each feature point in the second group of dual-camera images according to the t and the R, wherein the first distance is a distance from each feature point to an epipolar line corresponding to the feature point, wherein an epipolar line in the second image corresponding to the feature point $X_i$ is $l'_i = K'^{-T}[t]_x R K^{-1} X_i$ when each feature point is the feature point $X_i$ in the feature point pair $(X_i,X'_i)$, wherein an epipolar line in the first image corresponding to the feature point $X'_i$ is $l_i = -K^{-T} R^{-1} [t]_x K'^{-1} X'_i$ when each feature point is the feature point $X'_i$ in the feature point pair $(X_i,X'_i)$, wherein $[t]_x$ is an antisymmetric matrix $$\begin{bmatrix} 0 & -t_z & t_y \\ t_z & 0 & -t_x \\ -t_y & t_x & 0 \end{bmatrix}$$

defined by the t, wherein K is an intrinsic parameter matrix of the first camera, and wherein K' is an intrinsic parameter matrix of the second camera;

obtain a second distance according to the first distance of each feature point, wherein the second distance is an average value of first distances of all feature points;

re-obtain the t and the R according to a feature point, wherein a difference between the first distance of the feature point and the second distance is less than or equal to a specified variance threshold; and repeat the foregoing process until a difference between the first distance of each feature point in the second group of dual-camera images and the second distance is less than the specified variance threshold.

* * * * *

UNITED STATES PATENT AND TRADEMARK OFFICE
CERTIFICATE OF CORRECTION

PATENT NO. : 10,559,090 B2
APPLICATION NO. : 15/572375
DATED : February 11, 2020
INVENTOR(S) : Zhongwei Tang et al.

Page 1 of 1

It is certified that error appears in the above-identified patent and that said Letters Patent is hereby corrected as shown below:

On the Title Page

Page 2, item (56), Other Publications, 2nd Column, Line 16: "Pattern Recognition and Machine" should read "Pattern Analysis and Machine"

In the Claims

Claim 11, Column 38, Line 8: "error ($t_i$) of first" should read "error ($t_1$) of first"

Claim 11, Column 38, Line 50: "the ($t_i$) is greater than" should read "the ($t_1$) is greater than"

Signed and Sealed this
Twenty-sixth Day of May, 2020

Andrei Iancu
*Director of the United States Patent and Trademark Office*